(12) United States Patent
Yamada et al.

(10) Patent No.: US 9,505,372 B2
(45) Date of Patent: Nov. 29, 2016

(54) AIRBAG DEVICE FOR A FRONT PASSENGER SEAT

(71) Applicant: TOYODA GOSEI CO., LTD., Kiyosu-shi, Aichi-ken (JP)

(72) Inventors: Ikuo Yamada, Kiyosu (JP); Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/660,982

(22) Filed: Mar. 18, 2015

(65) Prior Publication Data

US 2016/0046257 A1 Feb. 18, 2016

(30) Foreign Application Priority Data

Aug. 12, 2014 (JP) ................................. 2014-164509

(51) Int. Cl.
| | |
|---|---|
| *B60R 21/233* | (2006.01) |
| *B60R 21/2338* | (2011.01) |
| *B60R 21/205* | (2011.01) |
| *B60R 21/231* | (2011.01) |

(52) U.S. Cl.
CPC ......... *B60R 21/2338* (2013.01); *B60R 21/205* (2013.01); *B60R 21/233* (2013.01); *B60R 21/23138* (2013.01); *B60R 2021/23161* (2013.01); *B60R 2021/23308* (2013.01); *B60R 2021/23324* (2013.01); *B60R 2021/23386* (2013.01)

(58) Field of Classification Search
CPC ............ B60R 21/2338; B60R 21/233; B60R 21/205; B60R 2021/23161; B60R 2021/23386; B60R 2021/23308
See application file for complete search history.

(56) References Cited

U.S. PATENT DOCUMENTS

| | | | | |
|---|---|---|---|---|
| 3,879,056 | A * | 4/1975 | Kawashima | .......... B60R 21/233 280/743.2 |
| 4,262,931 | A | 4/1981 | Strasser et al. | |
| 5,609,363 | A * | 3/1997 | Finelli | ................... B60R 21/231 280/730.1 |
| 7,461,862 | B2 * | 12/2008 | Hasebe | ................. B60R 21/233 280/728.1 |
| 7,549,672 | B2 * | 6/2009 | Sato | ...................... B60R 21/207 280/729 |
| 7,712,769 | B2 * | 5/2010 | Hasebe | ................. B60R 21/201 280/729 |

(Continued)

FOREIGN PATENT DOCUMENTS

| | | |
|---|---|---|
| JP | 05-116583 A | 5/1993 |
| JP | 06-072276 A | 3/1994 |

*Primary Examiner* — Drew Brown
(74) *Attorney, Agent, or Firm* — POSZ LAW GROUP, PLC

(57) ABSTRACT

An airbag includes a main bag section which protrudes rearward out of a housing and deploys in front of a front passenger seat and a center bag section which deploys toward an inboard direction from the main bag section in a width direction of the vehicle and in front of a space between the front passenger seat and a driver's seat in such a manner as to extend rearward from a side of the housing. A rear end region of the center bag section is deployable rearward relative to the main bag section. The airbag further includes an outer tether which extends outside of the airbag from a front end region of the center bag section and is connected to a vicinity of the housing by a leading end of the outer tether.

5 Claims, 38 Drawing Sheets

(56) References Cited

U.S. PATENT DOCUMENTS

| | | | | |
|---|---|---|---|---|
| 8,371,612 B2* | 2/2013 | Williams | ............ | B60R 21/2338 |
| | | | | 280/743.2 |
| 8,864,170 B2* | 10/2014 | Yamada | .............. | B60R 21/2338 |
| | | | | 280/732 |
| 9,162,645 B2* | 10/2015 | Cho | ...................... | B60R 21/205 |
| 9,205,798 B1* | 12/2015 | Jindal | ..................... | B60R 21/16 |
| 2015/0166002 A1* | 6/2015 | Fukawatase | .......... | B60R 21/233 |
| | | | | 280/730.1 |
| 2015/0258958 A1* | 9/2015 | Belwafa | ................ | B60R 21/233 |
| | | | | 280/729 |
| 2015/0307056 A1* | 10/2015 | Cheng | ................... | B60R 21/231 |
| | | | | 280/729 |
| 2015/0343986 A1* | 12/2015 | Schneider | ............ | B60R 21/205 |
| | | | | 280/729 |
| 2015/0367802 A1* | 12/2015 | Fukawatase | .......... | B60R 21/205 |
| | | | | 280/732 |

* cited by examiner

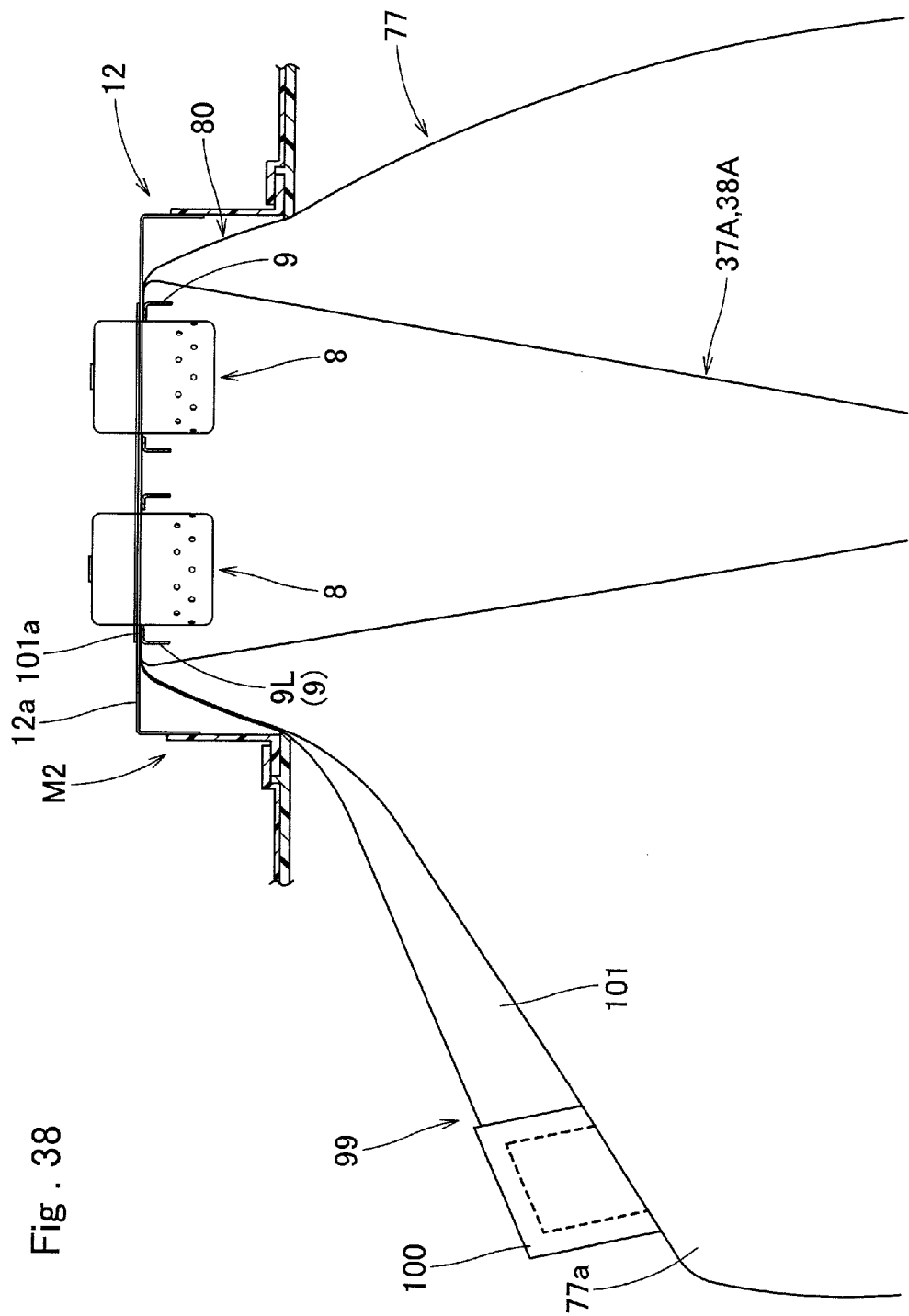

AIRBAG DEVICE FOR A FRONT PASSENGER SEAT

CROSS REFERENCE TO RELATED APPLICATIONS

The Present application claims priority from Japanese Patent Application No. 2014-164509 of Yamada et al., filed on Aug. 12, 2014, the disclosure of which is hereby incorporated into the present application by reference.

BACKGROUND OF THE INVENTION

1. Field of the Invention

The present invention relates to an airbag device for a front passenger seat adapted to be mounted on an instrument panel located in front of a front passenger seat of a vehicle and including an airbag housed in a folded-up configuration for rearward deployment.

2. Description of Related Art

JP Sho 56-67649, as well as JP Hei 5-116583 and JP Hei 6-72276, discloses a known airbag device for a front passenger seat which includes in an airbag, in addition to a main bag section for protecting a passenger seated in a front passenger seat, a center bag section which is inflatable on an inboard side of the main bag section in a width direction of a vehicle for protecting a passenger seated between the driver's seat and the front passenger seat.

In this conventional airbag device, when the airbag inflates with an inflation gas fed from an inflator and emerges from a housing in an initial stage of deployment, it unfurls the center bag section rearward and toward an inboard direction in a left and right direction from a side of the housing. However, since the front end region of the center bag section is not connected to the housing, it cannot help protruding obliquely rearward considerably in an initial stage of deployment and then rebounding forward in such a manner as to shrink forward while expanding in a vehicle width direction. If such a rebounding behavior is repeated, it would take a while for the airbag to form a fully deployed contour ready for cushioning a passenger, and therefore, such an airbag device has a room for improvement in quickness of deployment.

SUMMARY OF THE INVENTION

An object of the present invention is to provide an airbag device for a front passenger seat that is capable of inflating an airbag with a center bag section deployable in an area between the driver's seat and front passenger seat to a fully deployed contour quickly.

The object of the invention will be achieved by a following airbag device for a front passenger seat:

The airbag device for a front passenger seat adapted to be mounted on an instrument panel of a vehicle in front of a front passenger seat includes a housing adapted to be disposed in the instrument panel and an airbag which is housed in the housing in a folded-up configuration and is inflatable with an inflation gas for deployment rearward inside the vehicle. The airbag includes:

a main bag section which protrudes rearward out of the housing and deploys in front of the front passenger seat;
  a center bag section which deploys toward an inboard direction from the main bag section in a width direction of the vehicle and in front of a space between the front passenger seat and a driver's seat in such a manner as to extend rearward from a side of the housing, a rear end region of the center bag section being deployable rearward relative to the main bag section; and
  an outer tether which extends outside of the airbag from a front end region of the center bag section and is connected to a vicinity of the housing by a leading end of the outer tether.

With the airbag device for a front passenger seat of the invention, at airbag deployment, the outer tether disposed outside of the airbag connects the front end region of the center bag section, which is so deployable as to extend rearward from a side of the housing, to a vicinity of the housing. The outer tether will prevent the center bag section from protruding obliquely rearward considerably out of the housing in an initial stage of airbag deployment, and also prevent the front end region of the center bag section from expanding in a vehicle width direction. Accordingly, the outer tether will prevent such subsequent rebounding behavior of the center bag section that would shrink forward while expanding in a width direction and oscillate repeatedly in a front and rear direction while inflating. As a result, the airbag will form a fully deployed contour quickly. With the airbag device of the invention, especially, the center bag section is so configured that the rear end region deploys rearward relative to the main bag section. Although this configuration seems likely to let the center bag section protrude obliquely rearward considerably in an initial stage of deployment, the outer tether will prevent the center bag section from oscillating or bounding back and forth repeatedly while unfurling, and will help inflate the airbag to a fully deployed contour quickly.

Therefore, the airbag device for a front passenger seat of the invention is capable of inflating the airbag with a center bag section deployable in a space between the driver's seat and front passenger seat into a fully deployed contour quickly.

Since the center bag section is so configured that the rear end region is deployable rearward relative to the main bag section, the airbag device of the invention will protect a passenger seated in the front passenger seat adequately in such an instance where the passenger moves diagonally forward and toward the center in a left and right direction in the event of an oblique collision or an offset collision of the vehicle.

The outer tether in the airbag device of the invention may be so configured as to extend from a side wall of the center bag section which faces away from the main bag section, or to extend from a front edge of the center bag section.

In the airbag device configured as above, it is desired that:
  the main bag section includes a mounting region which is located at a front end of the main bag section as deployed and is secured to the housing, a rear side wall deployable on a rear end region of the main bag section for protecting a passenger and a front-rear tether which connects the mounting region and the rear side wall and extends in a front and rear direction inside the main bag section; and
  the center bag section internally includes a vertical tether which connects opposite walls of the center bag section opposing in an up and down direction at airbag deployment.

With this configuration, the front-rear tether will prevent the main bag section from unfurling in such a manner that the rear side wall protrudes rearward considerably in an initial stage of airbag deployment, and will help inflate the airbag into a fully deployed contour even more quickly while suppressing an oscillating behavior of the airbag in a front and rear direction. Further, the vertical tether of the center bag section will prevent the center bag section from inflating in such a manner as to expand in an up and down direction when the center bag section moves forward after protruding rearward in an initial stage of airbag deployment, and will prevent the center bag section from oscillating while swelling and contracting in an up and down direction, thus help inflate the airbag into a fully deployed contour quickly.

If the center bag section further internally includes a left-right tether which connects together opposite walls of the center bag section opposing in a left and right direction at airbag deployment, the center bag section will be prevented from inflating while repeatedly swelling and contracting in a left and right direction, not only at the front end region but also at an intermediate region in a front and rear direction, thus the airbag will be inflated into a fully deployed contour quickly. Such left-right tether will also limit a volume of the center bag section at inflation.

Furthermore, if the main bag section internally includes a second vertical tether that connects opposite walls of the main bag section opposing in an up and down direction at airbag inflation, the vertical tether will prevent the main bag section from inflating in such a manner as to swell and contract in an up and down direction repeatedly, thus help inflate the airbag into a fully deployed contour quickly. Such vertical tether will also limit a volume of the main bag section.

BRIEF DESCRIPTION OF DRAWINGS

FIG. 38 is a partial enlarged schematic section of the airbag device of the second embodiment showing a vicinity of an outer tether as the airbag is deployed.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
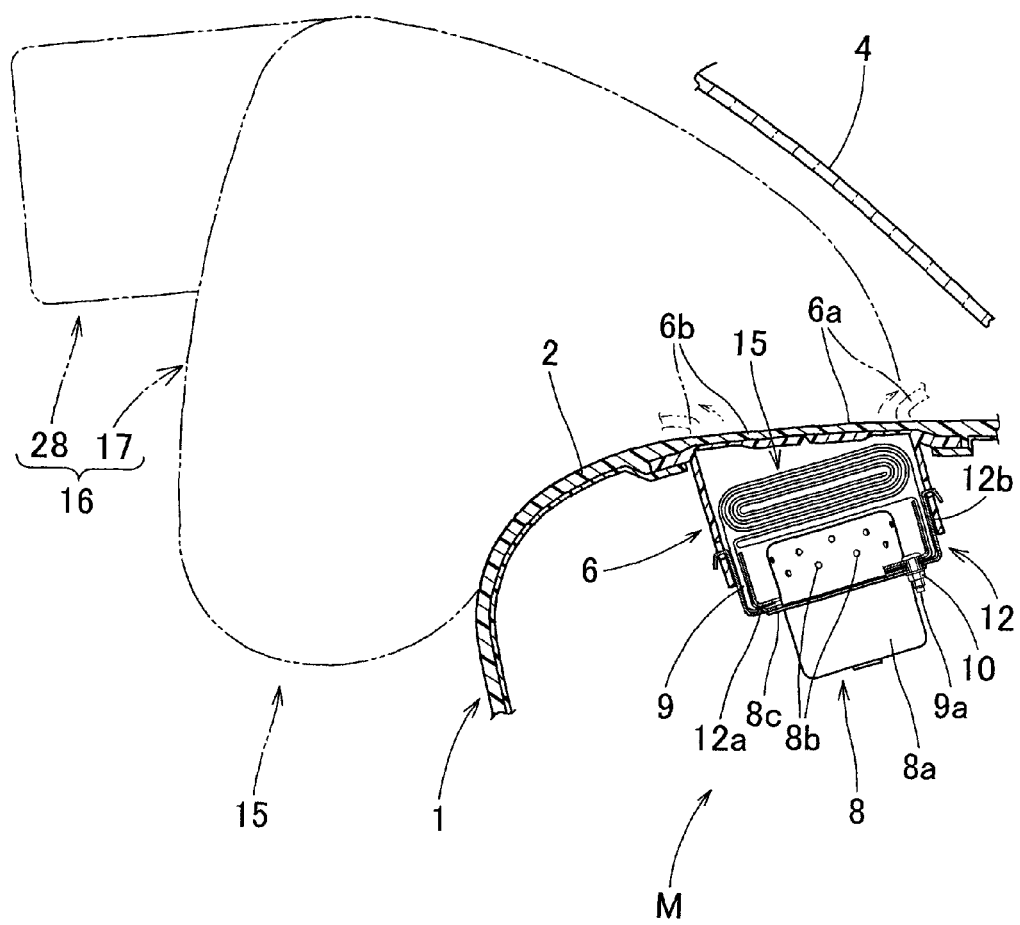
FIG. 1 is a schematic vertical section of an airbag device for a front passenger seat according to the first embodiment of the invention as mounted on a vehicle.
Figure 2:
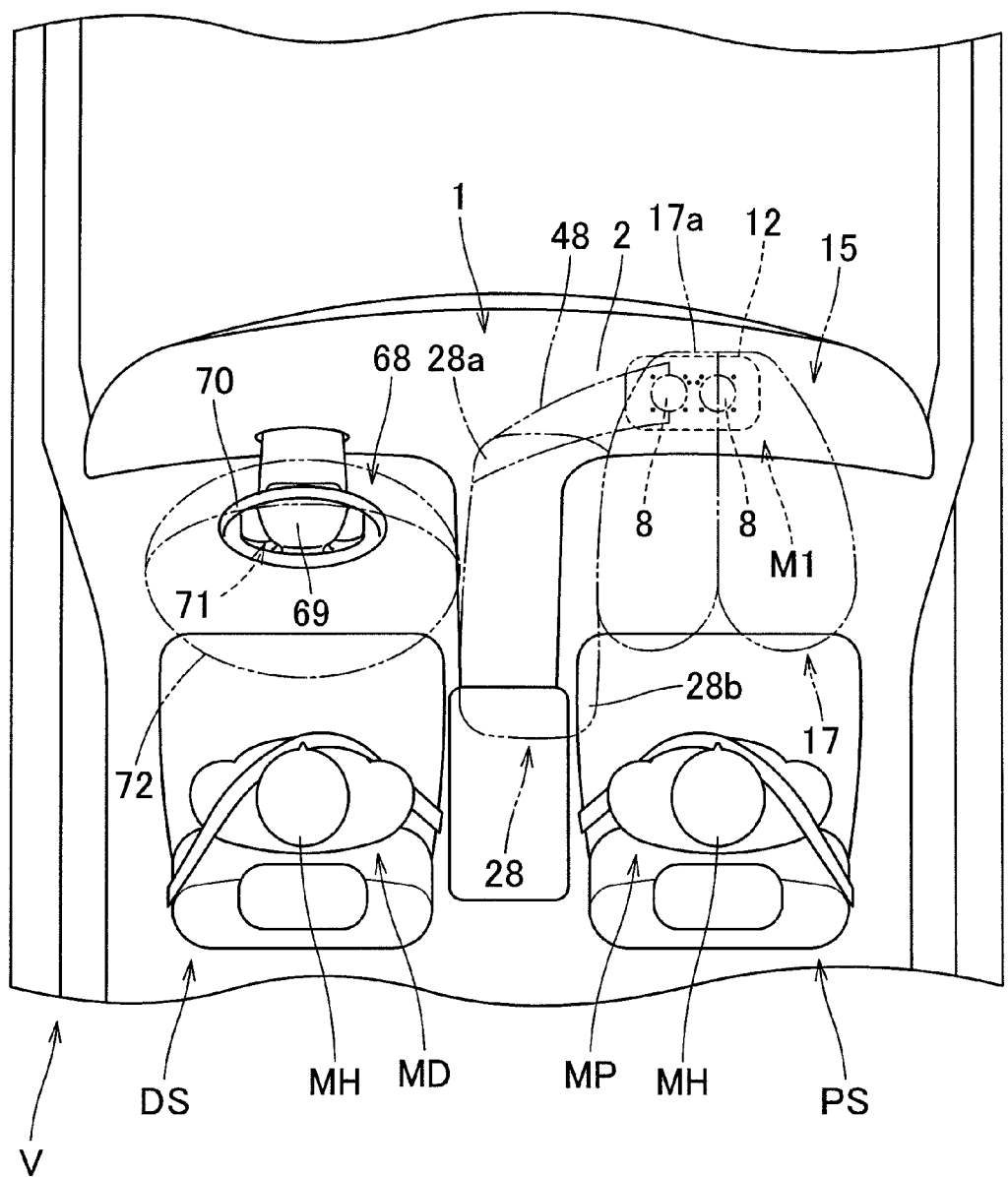
FIG. 2 is a schematic plan view of the airbag device of FIG. 1 as mounted on a vehicle.
Figure 3:
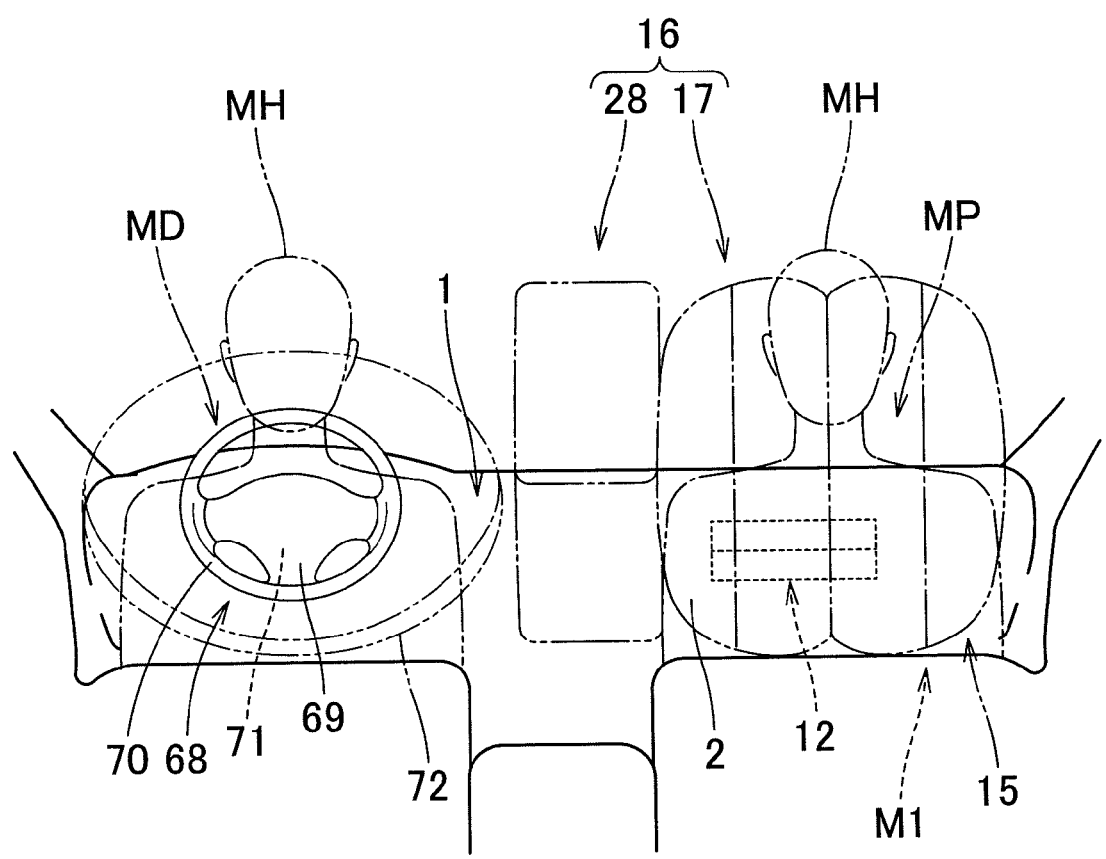
FIG. 3 is a schematic front elevation of the airbag device of FIG. 1 as mounted on a vehicle.

FIGS. 1 to 3 depict an airbag device M1 for a front passenger seat according to a first embodiment of the invention. The airbag device M1 is a top-mount airbag device stored inside a top plane 2 of an instrument panel or dashboard 1 in front of a front passenger seat PS of a vehicle V. Unless otherwise specified, front/rear, up/down and left/right directions in this specification are intended to refer to front/rear, up/down and left/right directions of the vehicle V.

As shown in FIGS. 1 and 2, the airbag device M1 includes an airbag 15, which is folded up, two inflators 8 for supplying the airbag 15 with an inflation gas, a case or housing 12 for housing and holding the airbag 15 and inflators 8, two retainers 9 for attaching the airbag 15 and inflators 8 to the case 12 and an airbag cover 6 for covering the airbag 15 from above.

The airbag cover 6 is integral with the dashboard 1 made from synthetic resin and includes two doors, i.e. front and rear doors 6a and 6b adapted to open when pushed by the airbag 15 upon airbag deployment. The airbag cover 6 further includes around the doors 6a and 6b a joint wall 6c, which is coupled to the case 12.

As shown in FIG. 2, the inflators 8 are disposed side by side in a left and right direction. Each of the inflators 8 includes a main body 8a which is generally columnar in shape and provided with gas discharge ports 8b, and a flange 8c for attachment to the case 12, as shown in FIG. 1. Each of the inflators 8 of this specific embodiment is so designed as to be actuated in the event of a frontal collision, an oblique collision or an offset collision of a vehicle V.

Figure 21:
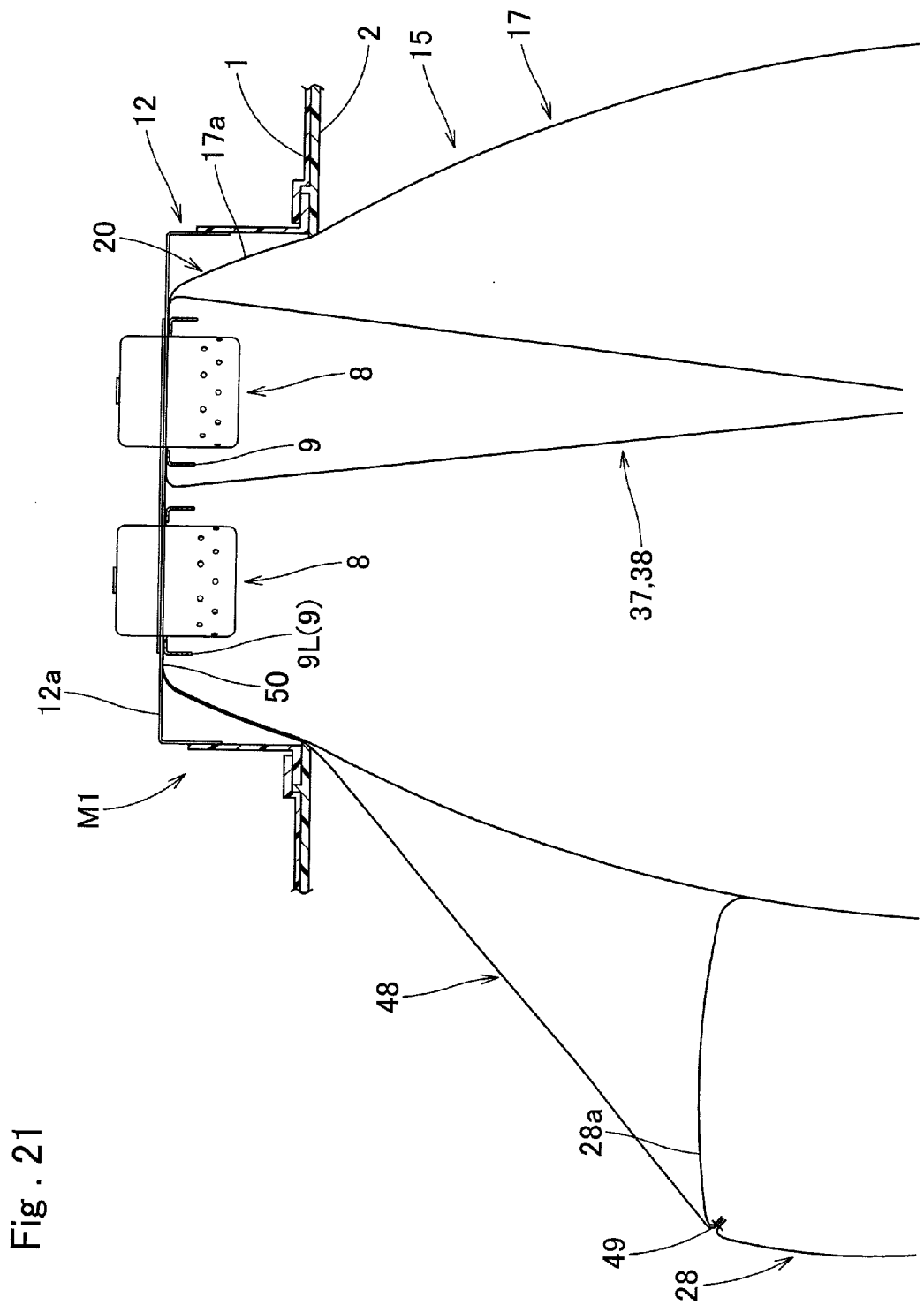
FIG. 21 is a partial enlarged schematic section of the airbag device of the first embodiment showing a vicinity of an outer tether as the airbag is deployed.
Figure 22:
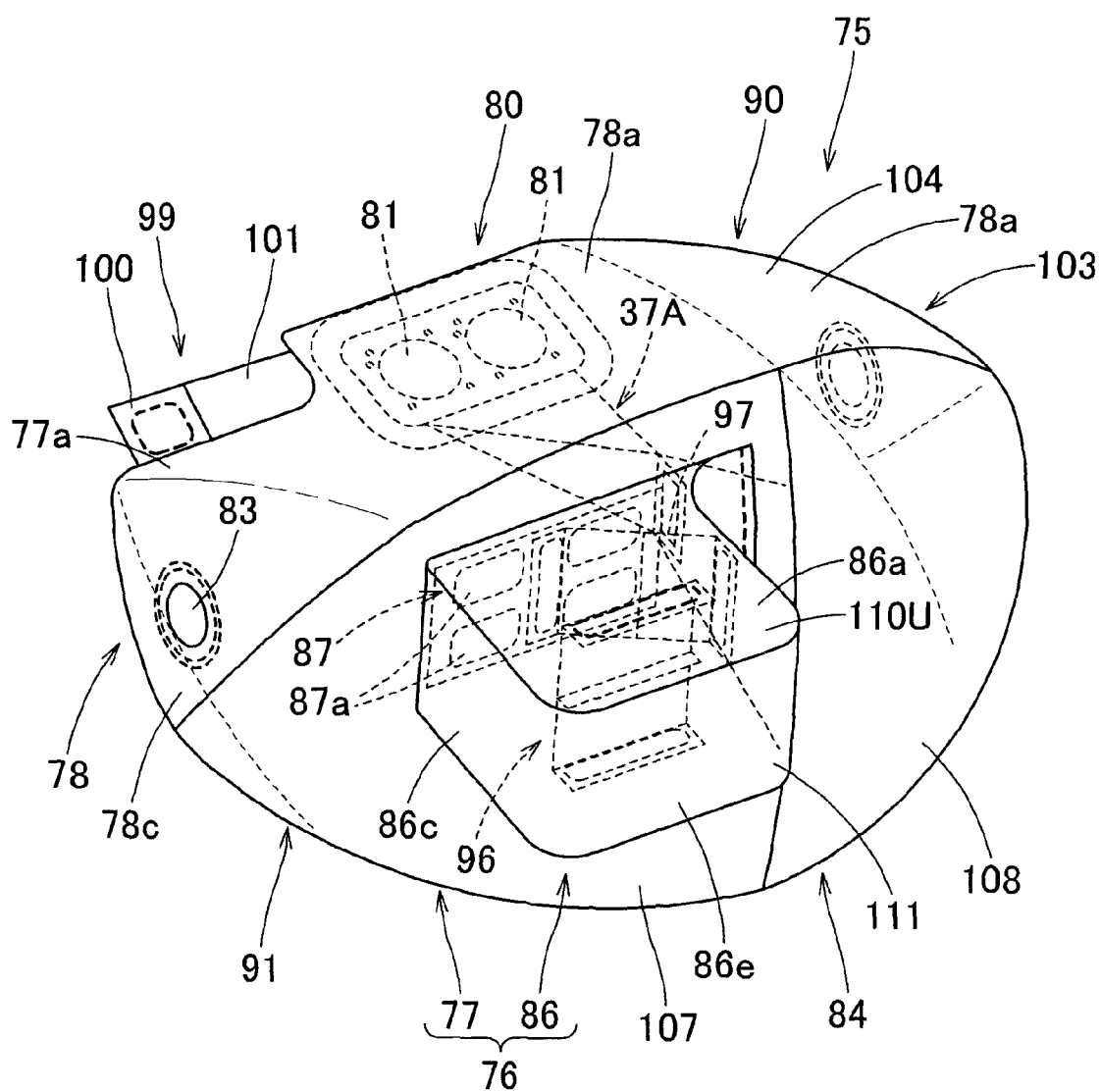
FIG. 22 is a perspective view of an airbag for use in an airbag device according to the second embodiment of the invention as inflated by itself, viewed from left rear direction.
Figure 23:
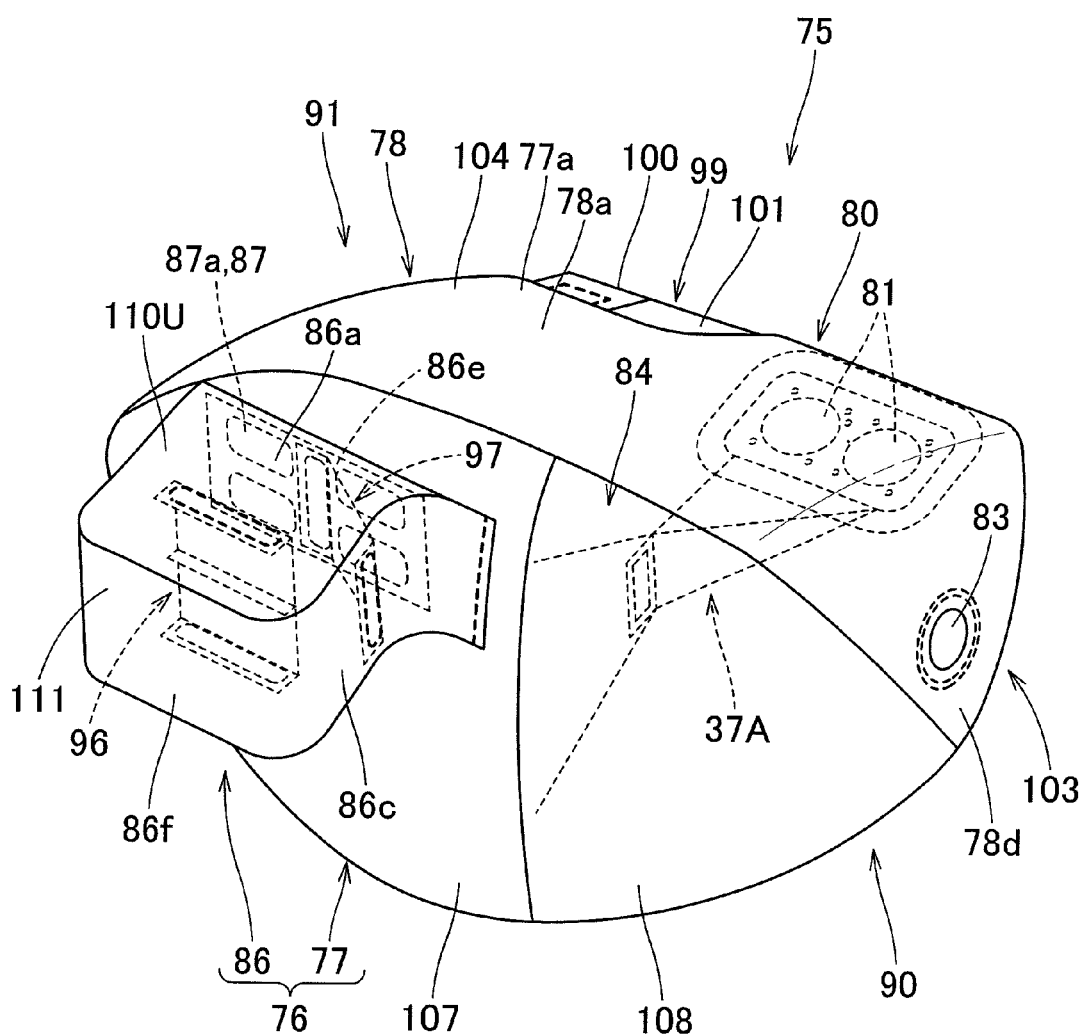
FIG. 23 is a perspective view of the airbag of FIG. 22 as inflated by itself, viewed from right rear direction.

As shown in FIG. 1, the case or housing 12 is made of sheet metal into a generally rectangular parallelepiped with a rectangular opening at the top, and includes a generally rectangular bottom wall 12a to which the inflators 8 are inserted from below and attached and a circumferential wall 12b which extends upward from an outer edge of the bottom wall 12a and retains the joint wall 6c of the airbag cover 6. The airbag 15 and inflators 8 are attached to the bottom wall 12a of the case 12 by locating the retainers 9 inside the airbag 15 such that bolts (fixing means) 9a of the retainers 9 go through peripheries of later-described gas inlet ports 21 of the airbag 15, the bottom wall 12a of the case 12 and flanges 8c of the inflators 8 and by fastening the bolts 9a with nuts 10. As described later, a leading end 50 of an outer tether 48 of the airbag 15 is connected to the bottom wall 12a of the case 12 with the aid of a retainer 9L located on the left side, as shown in FIG. 21. Further, unillustrated brackets are provided on the bottom wall 12a for mounting on a vehicle body structure.

Referring to FIGS. 4 to 11, the airbag 15 includes a bag body 16 inflatable with an inflation gas, tethers 37, 40, 41, 42, 43, 44, 45 and 46 which are disposed inside the bag body 16 for controlling the contour of the bag body 16 as fully inflated and an outer tether 48 which connects a front end 28a of a later-described center bag section 28 of the bag body 16 as fully inflated to the case 12.

Figure 18:
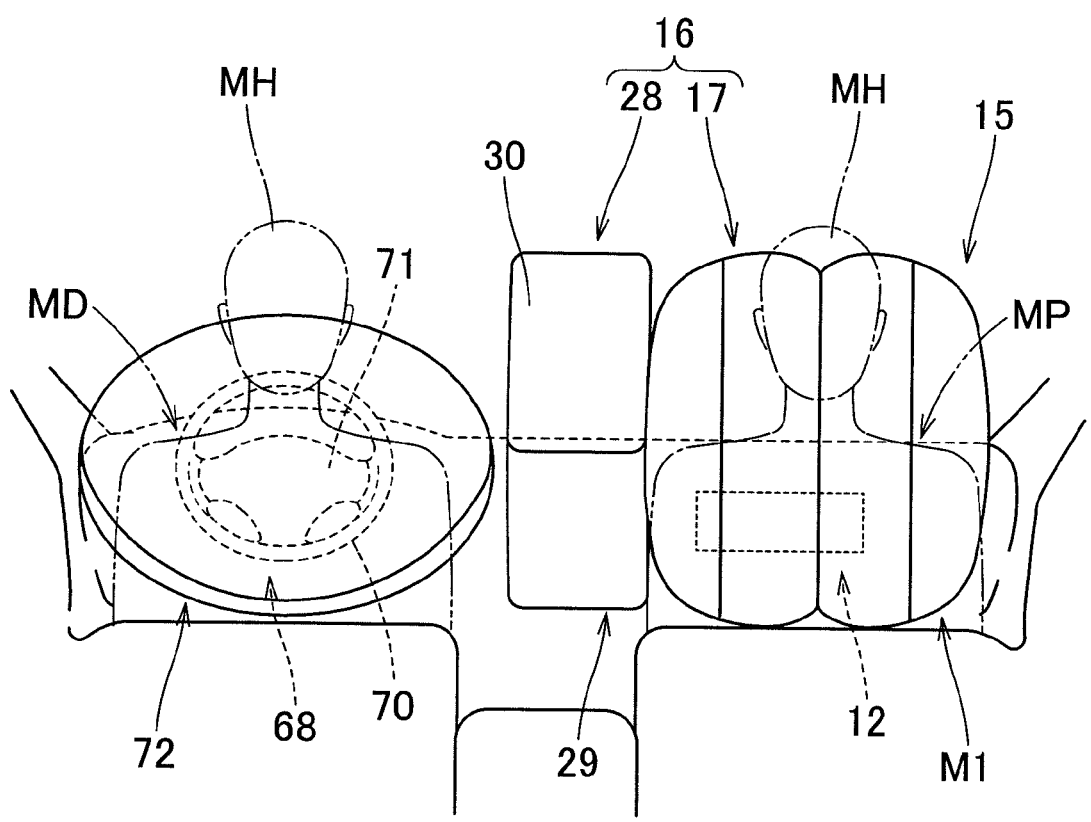
FIG. 18 is a schematic front elevation of the airbag device of the first embodiment as the airbag is deployed.
Figure 19:
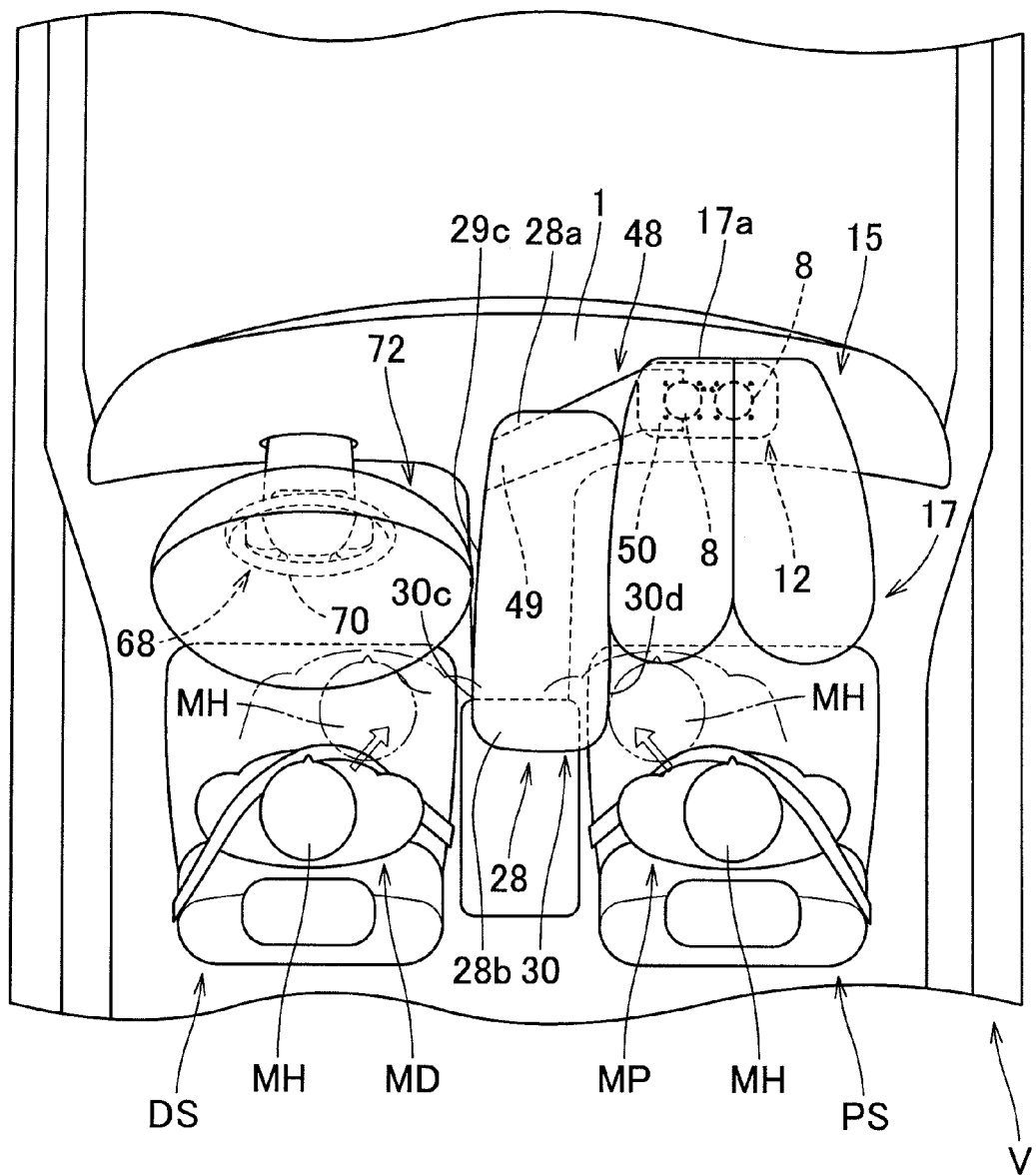
FIG. 19 is a schematic plan view of the airbag device of the first embodiment as the airbag is deployed.

The bag body 16 is fabricated of a flexible sheet material and includes a main bag section 17 which is deployable in front of a passenger MP seated in the front passenger seat PS and a center bag section 28 which is deployable toward an inboard direction from the main bag section 17 in a width direction of a vehicle V (i.e., on the left side of the main bag section 17, in this specific embodiment), as shown in FIGS. 18 and 19. The main bag section 17 and center bag section 28 are formed into a bag, respectively, and have a gas communication with each other through a later-described communication hole 33.

The main bag section 17 is designed to emerge from the case or housing 12 and deploy rearward, in front of a passenger MP seated in the front passenger seat PS. It is designed to inflate into a generally square conical contour and includes a rear side wall 24 deployable at the rear side to face a passenger MP and a circumferential wall 18 extending forward from a peripheral edge of the rear side wall 24 while tapering and converging at the front end.

Figure 6:
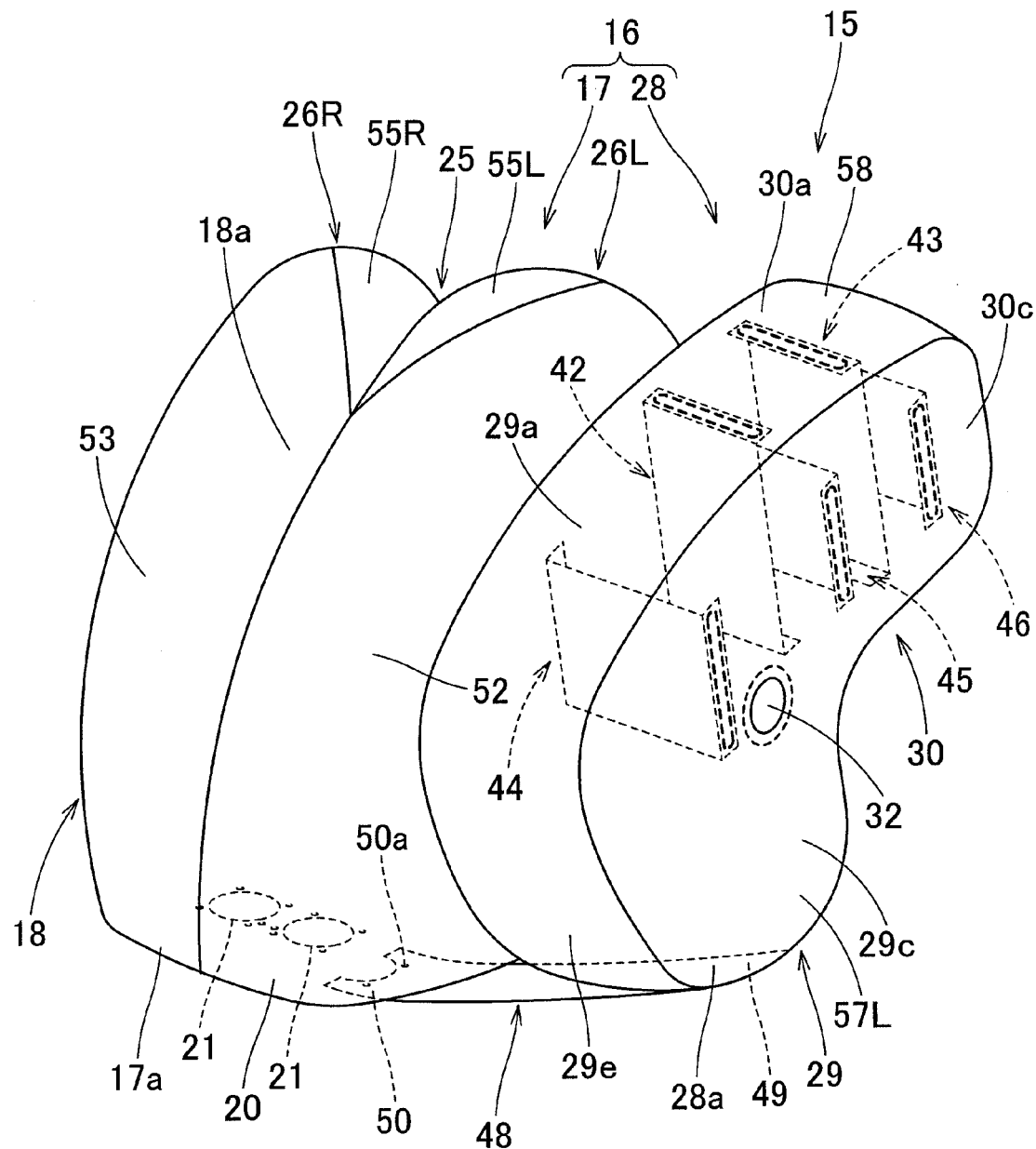
FIG. 6 is a perspective view of the airbag of FIG. 4 as inflated by itself, viewed from left front direction.
Figure 8:
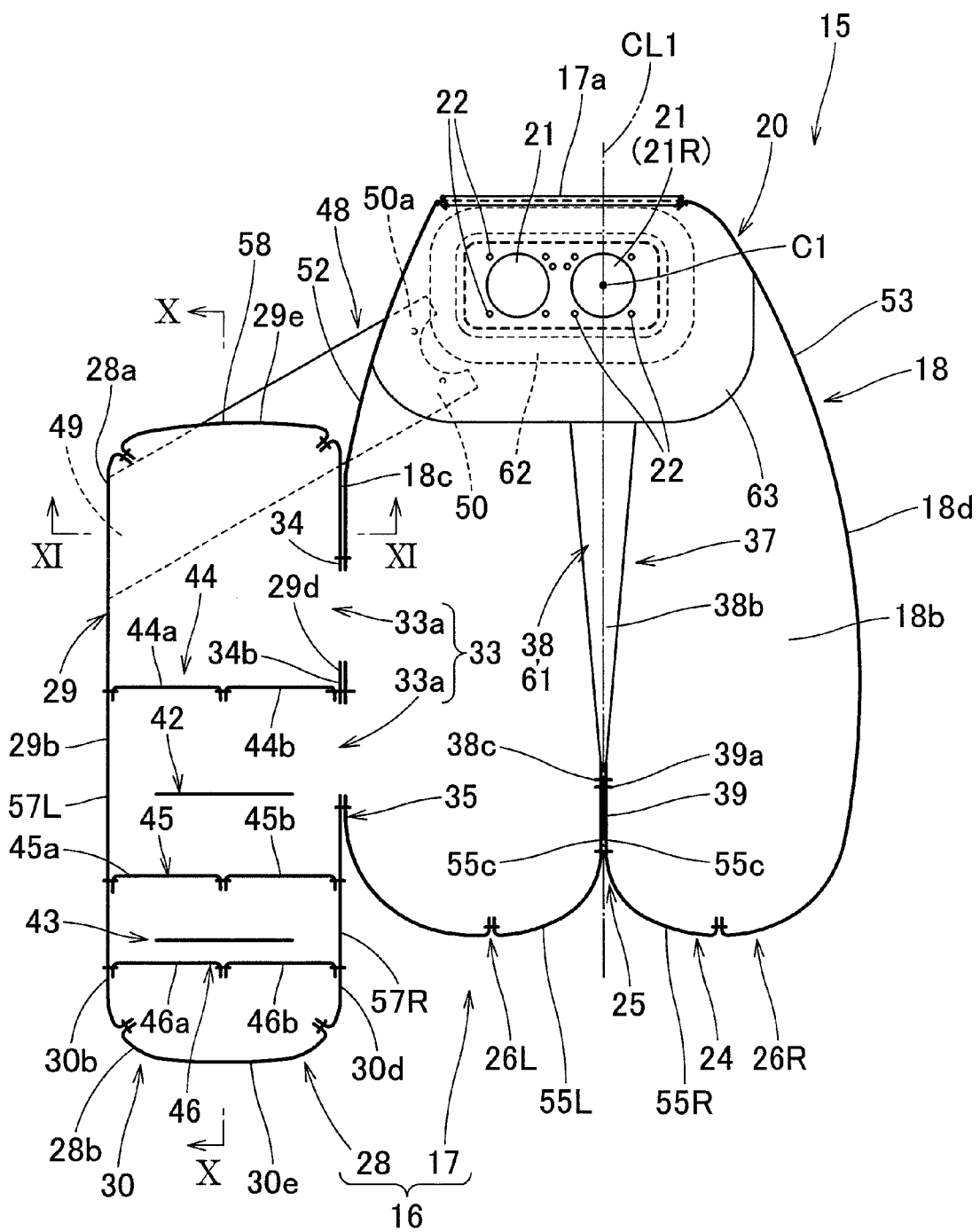
FIG. 8 is a schematic horizontal section of the airbag of FIG. 4.
Figure 20:
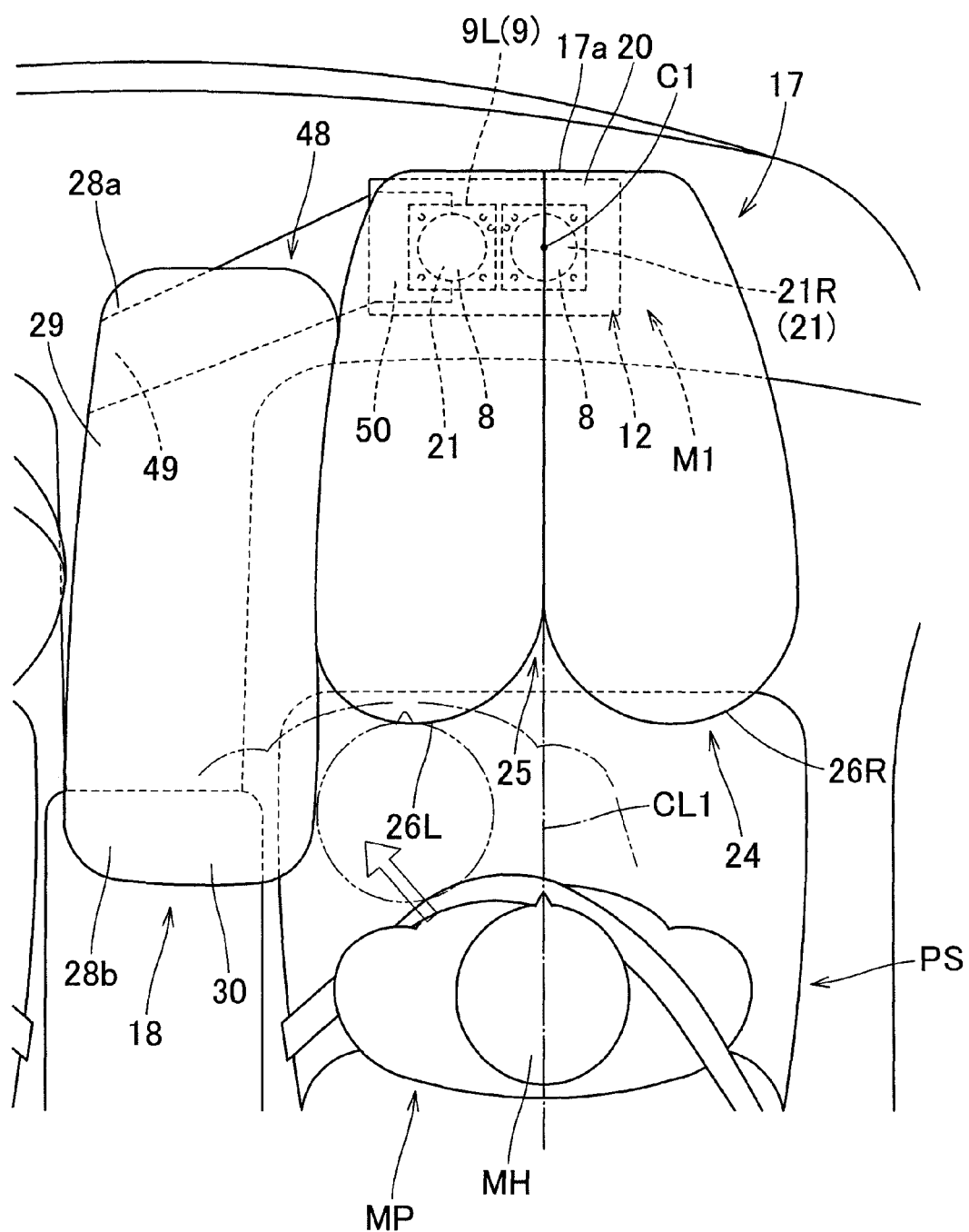
FIG. 20 is a schematic plan view of the airbag device of the first embodiment as the airbag is deployed.

The circumferential wall 18 is so deployable as to fill up a space between the top plane 2 of the dashboard 1 and the windshield 4 in front of the front passenger seat PS, and includes an upper side wall 18a and a lower side wall 18b extending generally along a left and right direction on upper and lower sides, and a left side wall 18c and a right side wall 18d extending generally along a front and rear direction at left and right sides. As shown in FIG. 6, the front end region of the circumferential wall 18 at airbag deployment serves as a mounting region 20 at which the airbag 15 is mounted on the case 12. The mounting region 20 is designed to stay inside the case 12 at airbag deployment, as shown in FIG. 21, and is provided, at its underside (i.e., on the lower side wall 18b), with two, generally round, gas inlet ports 21 disposed side by side in a left and right direction for introducing an inflation gas, as shown in FIGS. 6 and 8. In a periphery of each of the gas inlet ports 21 are a plurality of (respectively four, in the illustrated embodiment) mounting holes 22 for receiving the bolts 9a of the retainer 9 to secure the periphery of each of the gas inlet ports 21 to the bottom wall 12a of the case 12. In this specific embodiment, the main bag section 17 of the airbag 15 is secured to the case 12 and mounted on the vehicle V such that the center of the gas inlet port 21R, which is disposed on the right side, coincides with the center in a left and right direction of the front passenger seat PS, as shown in FIGS. 8 and 20. The center of the gas inlet port 21R will be called hereinafter a mounting center C1.

A vent hole 23 is provided on the right side wall 18d of the circumferential wall 18 for releasing an extra inflation gas.

Figure 4:
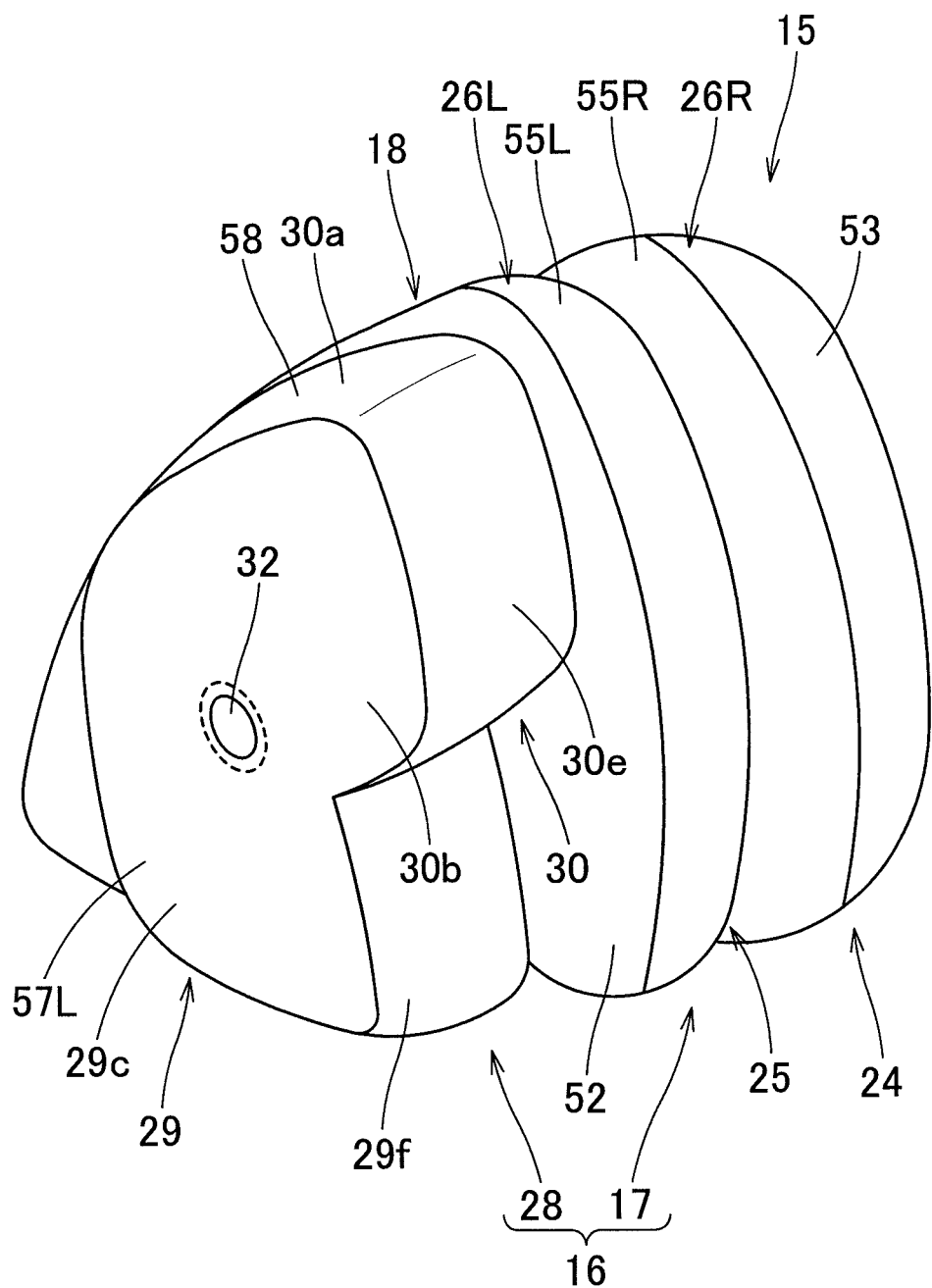
FIG. 4 is a perspective view of an airbag for use in the airbag device of FIG. 1 as inflated by itself, viewed from left rear direction.
Figure 5:
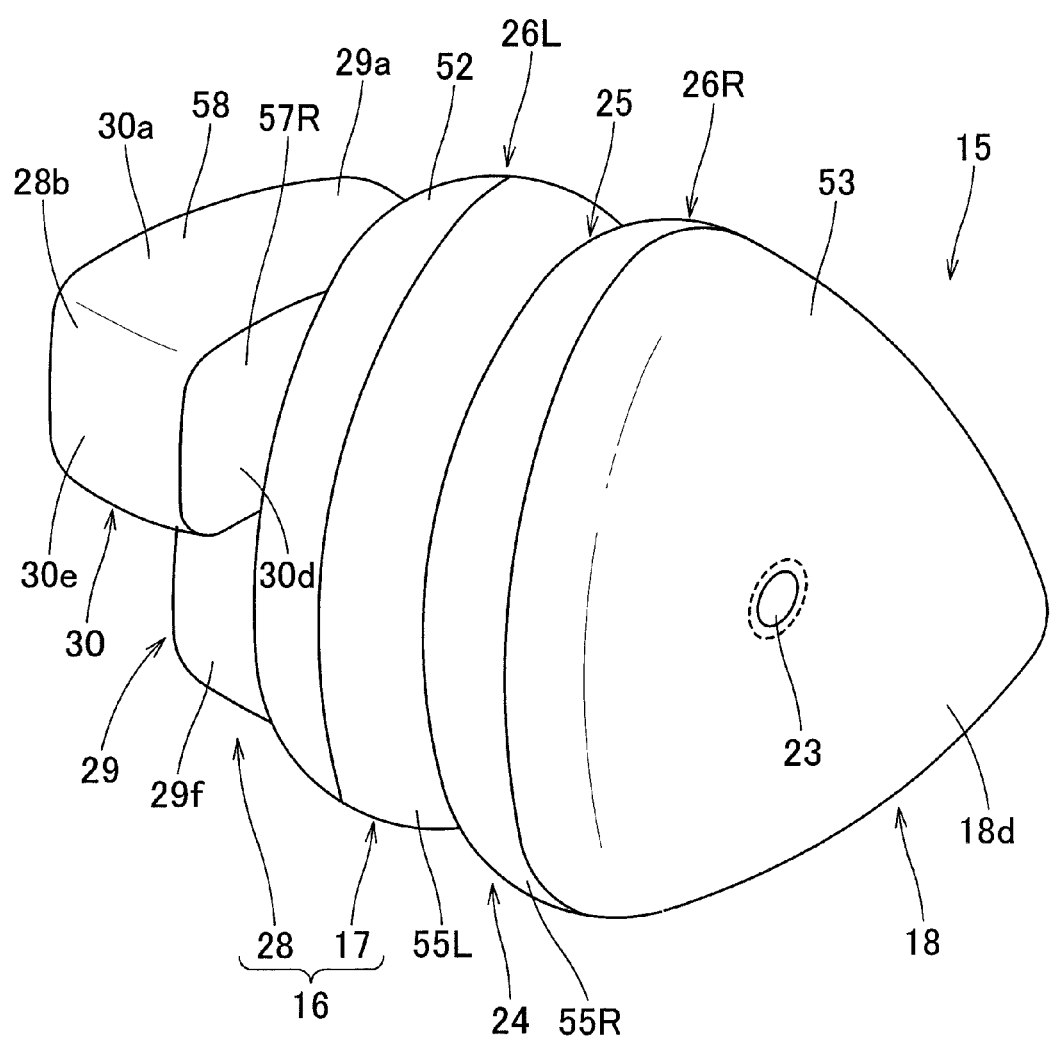
FIG. 5 is a perspective view of the airbag of FIG. 4 as inflated by itself, viewed from right rear direction.

The rear side wall 24 is so deployable slightly at a slant relative to an up and down direction that the lower end is disposed more rearward relative to the upper end as indicated by double-dotted lines in FIG. 1 and faces a passenger MP seated in the front passenger seat PS at airbag deployment. As shown in FIGS. 4, 5, 7 and 8, the rear side wall 24 at airbag deployment includes a recessed area 25 that is sunken forward and extends generally vertically at a position on the center line CL1 which passes through the mounting center C1 and extends generally along a front and rear direction. In this specific embodiment, the recessed area 25 extends over a generally entire area in an up and down direction of the rear side wall 24. On the left and right sides of the recessed area 25 are raised regions 26L and 26R which protrude rearward relative to the recessed area 25, as shown in FIGS. 4, 5, 7 and 8. That is, at full airbag inflation, the recessed area 25, which is sunken at the center in a left and right direction, and the raised regions 26L and 26R, which are located on the left and right sides of the recessed area 25, extend continuously along an up and down direction of the rear side wall 24 of the main bag section 17 (FIGS. 4 and 5). More specifically, in this embodiment, this unevenness created by the recessed area 25 and raised regions 26L and 26R extends in a uniform fashion over a generally entire area in an up and down direction of the rear side wall 24 and converges forward in the upper side wall 18a and lower side wall 18b of the circumferential wall 18. In this embodiment, a seam which sews or joins together inner circumferential edges 55b of a later-described inner left panel 55L and an inner right panel 55R forms the leading end of the recessed area 25, and seams which respectively sew up each of rear edges 52d and 53d of an outer left panel 52 and an outer right panel 53 and outer circumferential edges 55a of the inner left panel 55L and inner right panel 55R form tops of the raised regions 26L and 26R (FIG. 8).

The center bag section 28 is deployable in front of an area between the front passenger seat PS and the driver's seat DS disposed on the left side of the front passenger seat PS. More specifically, the center bag section 28 of the illustrated embodiment is deployable, as shown in FIGS. 18 and 19, in such a manner as to fill up a void space between the main bag section 17 and a later-described airbag 72 deployable over a steering wheel 68 located in front of the driver's seat DS. As shown in FIG. 19, the center bag section 28 is deployable out of the case (housing) 12 in such a manner as to extend rearward from a side of the case 12.

The center bag section 28 is inflatable into such a generally rectangular parallelepiped that the rear upper end region (rear end 28b) at airbag inflation is located rearward relative to the main bag section 17, as shown in FIG. 5. More specifically, the center bag section 28 includes a main body 29 which is deployable at a side (on the left side) of the main bag section 17 and a protruding region 30 which protrudes rearward from the rear upper end region of the main body 29 at airbag deployment. The main body 29 and protruding region 30 have a generally same and uniform width in a left and right direction at airbag deployment. A dimension in an up and down direction of the protruding region 30 is about half of that of the main body 29. The main body 29 includes an upper side wall 29*a* and a lower side wall 29*b* extending generally along a left and right direction on upper and lower sides, a left side wall 29*c* and a right side wall 29*d* extending generally along a front and rear direction at left and right sides and a front wall 29*e* and a rear wall 29*f* extending generally along a left and right direction at the front and rear. The protruding region 30 includes an upper side wall 30*a* and a lower side wall 30*b* extending generally along a left and right direction on upper and lower sides, a left side wall 30*c* and a right side wall 30*d* extending generally along a front and rear direction at left and right sides and a rear wall 30*e* extending generally along a left and right direction at the rear. In the illustrated embodiment, the upper side wall 30*a*, left side wall 30*c* and right side wall 30*d* of the protruding region 30 are continuous with the upper side wall 29*a*, left side wall 29*c* and right side wall 29*d* of the main body 29, respectively. Further, the rear wall 29*f* of the main body 29 is generally flush with the rear side wall 24 of the main bag section 17.

As shown in FIG. 19, the center bag section 28 is so designed as to be entirely located out of the case 12 at deployment of the airbag 15. At airbag deployment, the front end 28*a*, i.e., the front end of the main body 29, is deployed rearward relative to the front end 17*a* of the main bag section 17 and at the rear of the mounting region 20, and the rear wall 30*e* of the protruding region 30, which constitutes the rear end 28*b* of the center bag section 28, is located rearward relative to the rear side wall 24 of the main bag section 17. As shown in FIG. 20, the protruding region 30 is deployed diagonally forward left of the head MH of a passenger MP seated in the front passenger seat PS. The protruding region 30 is provided to protect the head MH of a passenger MP or of a driver MD seated in the driver's seat DS in the event of an oblique collision or an offset collision of a vehicle V, and a protruding amount from the rear side wall 24 and a dimension in an up and down direction of the protruding region 30 are so designed as to be capable of cushioning the head MH as the passenger MP or driver MD moves diagonally forward. That is, the protruding region 30 is so designed as to cushion the head MH of the passenger MP in the front passenger seat PS with the right side wall 30*d* deployable on the right side and cushion the head MH of the driver MD in the driver's seat DS with the left side wall 30*c* deployable on the left side (FIG. 19). Further, a width in a left and right direction of the center bag section 28 at airbag deployment is so designed that the left side wall 29*c* of the main body 29 is deployed proximate the airbag 72 for a steering wheel as fully deployed, such that the center bag section 28 covers an almost all space between the main bag section 17 and the airbag 72 for a steering wheel. The center bag section 28 is provided, on the left side wall 29*c*, with a vent hole 32 for releasing an extra inflation gas.

Figure 7:
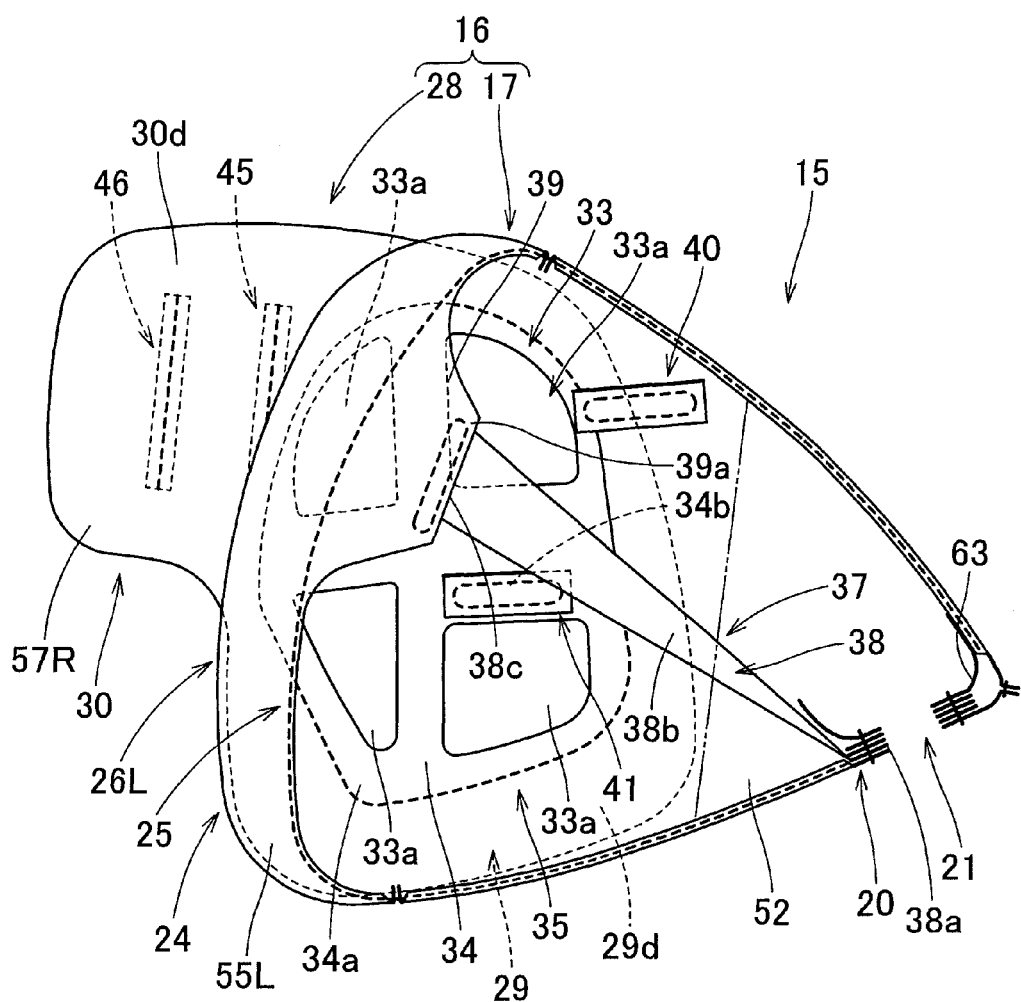
FIG. 7 is a schematic vertical section of the airbag of FIG. 4.
Figure 9:
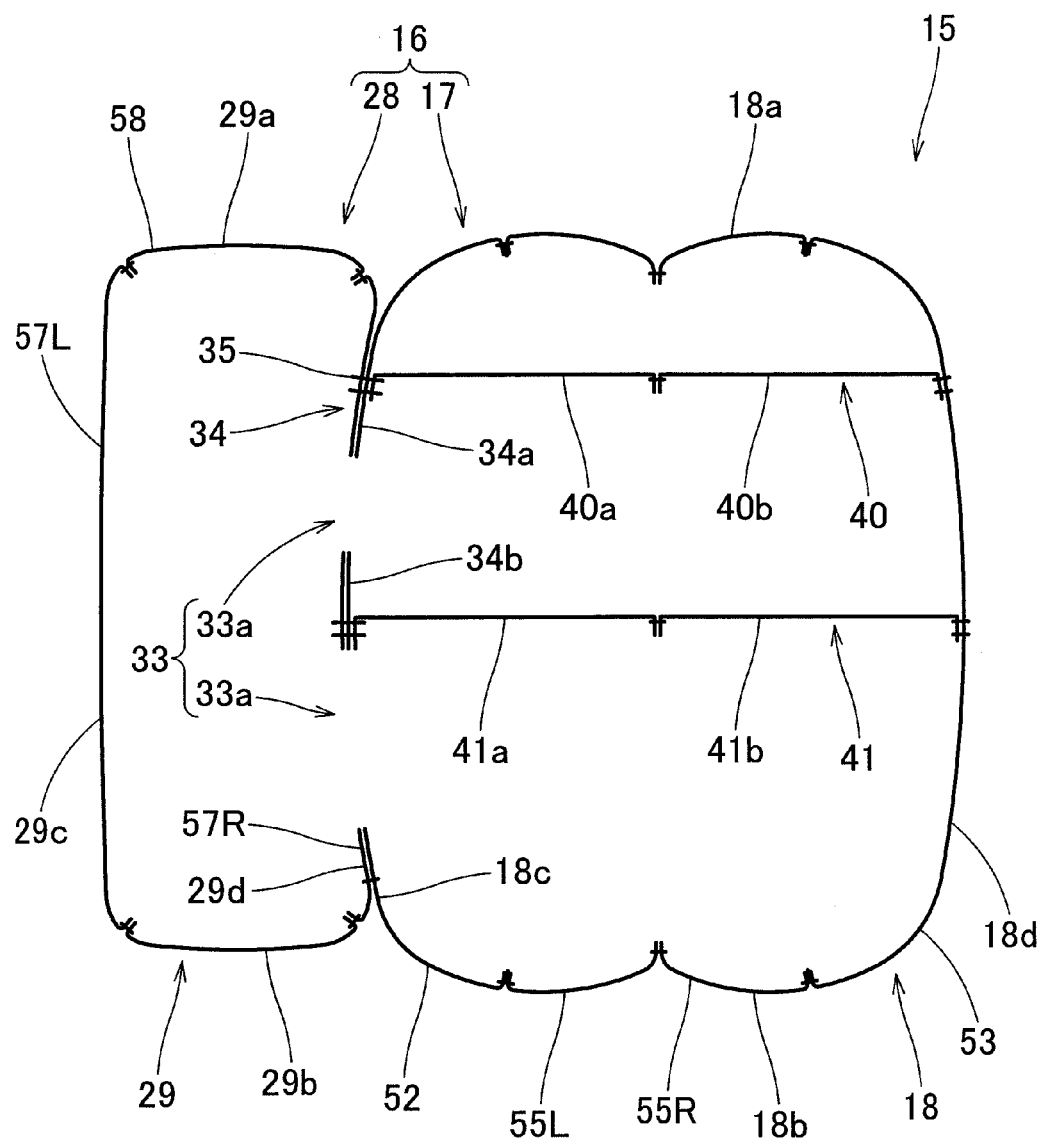
FIG. 9 is a schematic vertical section of the airbag of FIG. 4.
Figure 12:
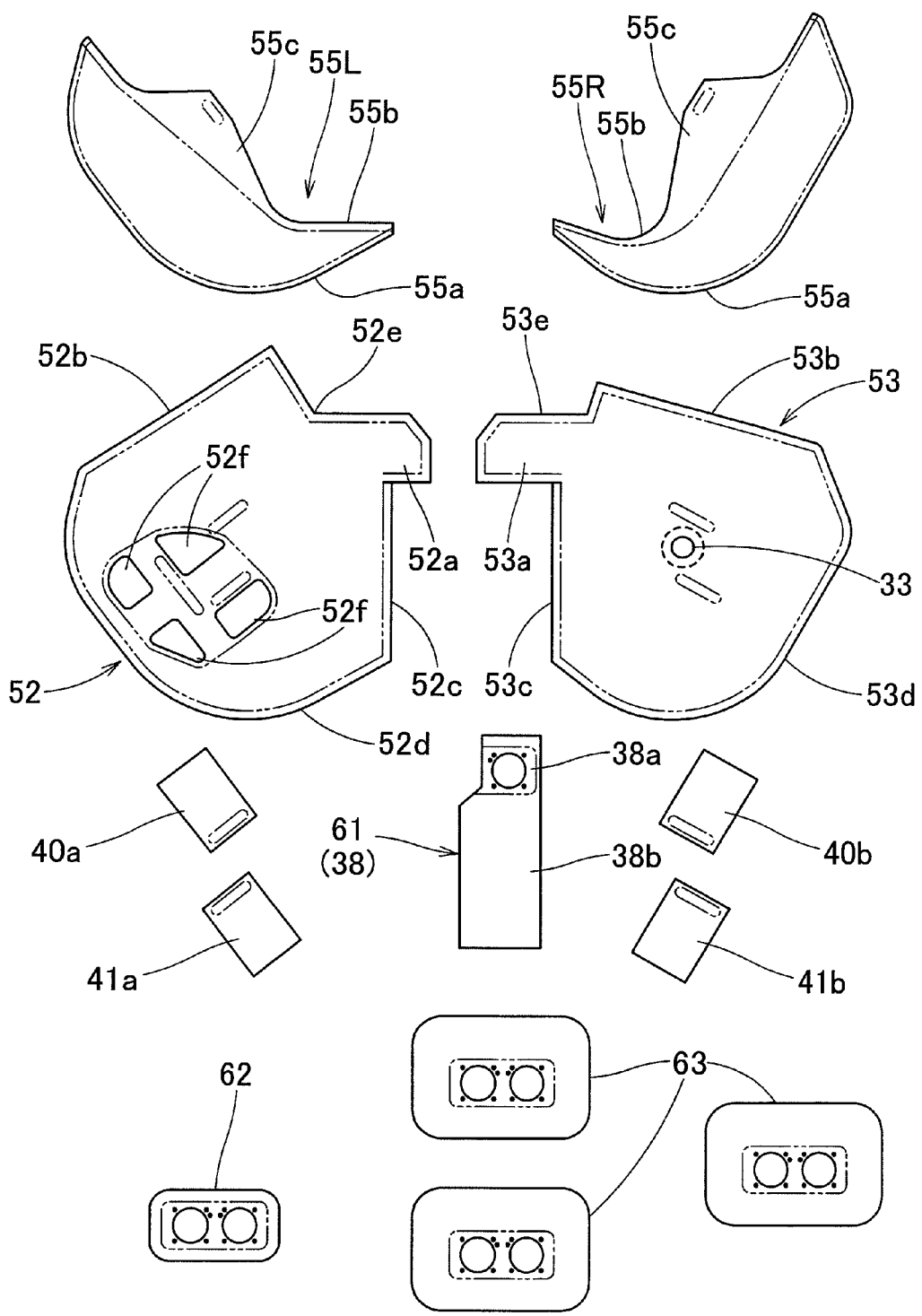
FIGS. 12 and 13 depict base cloths of the airbag of the first embodiment by plan views.
Figure 13:
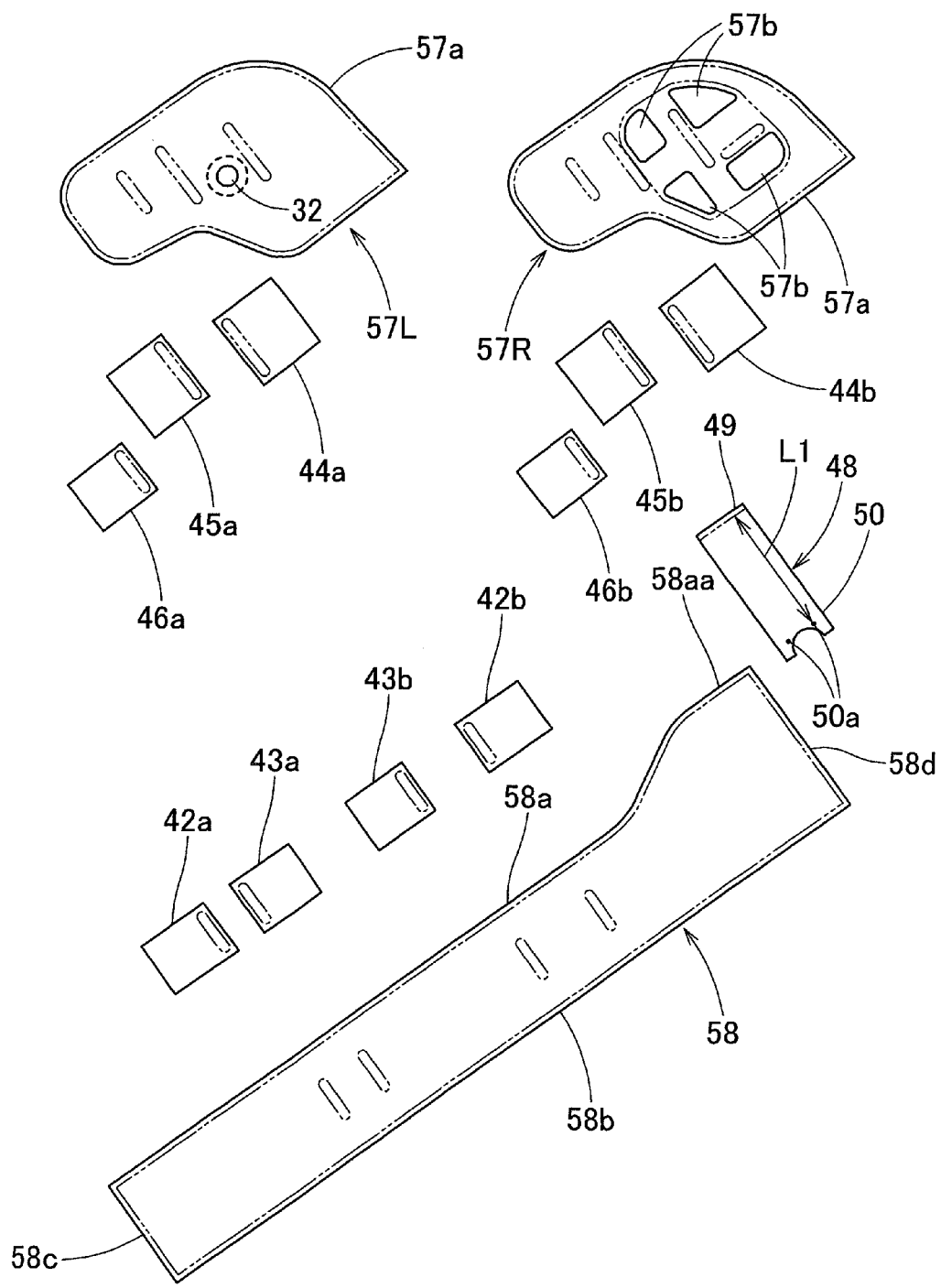

The center bag section 28 and main bag section 17 are in gas communication with each other through a communication hole 33 which is formed through the right side wall 29*d* of the main body 29 of the center bag section 28 and left side wall 18*c* of the main bag section 17 (FIGS. 7 to 9). As shown in FIG. 7, the communication hole 33 is composed of four openings 33*a* which are disposed side by side and one above the other. In the illustrated embodiment, each of the openings 33*a* has a greater opening area than the vent hole 23 or 32 (FIGS. 12 and 13). The right side wall 29*d* of the main body 29 of the center bag section 28 is sewn to the left side wall 18*c* of the main bag section 17 by an entire outer region 34*a* of a peripheral region 34 of the communication hole 33, thus the center bag section 28 is jointed with the main bag section 17. In the illustrated embodiment, the seam 35, which connects the center bag section 28 to the main bag section 17, is generally oval in outer contour, which contour is generally similar to the right side wall 29*d* of the main body 29, as shown in FIG. 7.

The bag body 16 internally includes eight tethers 37, 40, 41, 42, 43, 44, 45 and 46 as shown in FIGS. 7 to 10, more specifically, a front-rear tether 37 connecting a vicinity of the gas inlet port 21 and rear side wall 24 in the main bag section 17, two horizontal tethers 40 and 41 disposed inside the main bag section 17, two vertical tethers 42 and 43 and three left-right tethers 44, 45 and 46 disposed inside the center bag section 28.

As shown in FIG. 8, the front-rear tether 37 is disposed on the center line CL1 which passes through the center of the right gas inlet port 21R (i.e., the mounting center C1) and extends along a front and rear direction at airbag deployment, and is formed by jointing a front section 38 extending from a periphery of the gas inlet port 21 and a rear section 39 extending from the rear side wall 24 (FIGS. 7 and 8).

The front section 38 is formed by folding a material 61 shown in FIG. 12 into such a bilaterally symmetric shape deployable in a three dimensional shape approximate to a generally triangular pyramid that the front end extends generally in a left and right direction and the rear end extends generally in an up and down direction. As shown in FIGS. 7 and 8, in the illustrated embodiment, the front end region of the front section 38 serves as a joint region 38*a* to the bag body 16. The joint region 38*a* is provided with openings (reference numeral omitted) correspondent to the gas inlet port 21 and mounting holes 22 and is sewn to a periphery of the gas inlet port 21R of the mounting region 20 of the main bag section 17 by the entire periphery. The region of the front section 38 extending rearward from the gas inlet port 21 is a main section 38*b* which forms a three dimensional shape approximate to a generally triangular pyramid (FIGS. 7 and 8). The main section 38*b* is sewn to the front end 39*a* of the rear section 39 by the rear end 38*c*, and a dimension in an up and down direction of the rear end 38*c* is generally identical to a dimension in an up and down direction of the front end 39*a* of the rear section 39.

The rear section 39 is in a sheet shape, and is composed of extended regions 55*c* each of which is integral with the inner left panel 55L/inner right panel 55R forming the rear side wall 24 of the main bag section 17 and extends from an inner circumferential edge 55*b* of the inner left panel 55L/ inner right panel 55R. In other words, the rear section 39 has a two-ply structure and is integral with the inner left panel 55L and inner right panel 55R. More specifically, the front end region 39*a* of the rear section 39 jointed to the front section 38 is narrow and the rear end region is formed into a generally trapezoid enlarging in an up and down direction toward the inner circumferential edges 55*b* of the inner left panel 55L and inner right panel 55R. The front-rear tether 37 pulls the front end of the recessed area 25 of the rear side wall 24 forward and limits a clearance between the periphery of the gas inlet port 21 and rear side wall 24 at airbag deployment in order to prevent the rear side wall 24 from protruding rearward toward a passenger MP unduly in an initial stage of airbag deployment.

Two horizontal tethers 40 and 41 are disposed one above the other and above and below the front-rear tether 37, respectively, inside the main bag section 17 and connect the left side wall 18*c* and right side wall 18*d*. As shown in FIG. 7, the upper horizontal tether 40 is disposed forward relative to the lower horizontal tether 41. Each of the horizontal tethers 40 and 41 is formed into a band which extends generally along a left and right direction such that the width extends in a front and rear direction. Each of the tethers 40 and 41 is made by jointing a pair of base materials 40a and 40b/41a and 41b, as shown in FIG. 9. As shown in FIGS. 7 and 9, the horizontal tether 41 located on the lower side is connected, by the first end, to an inner region 34b of the peripheral area 34 in between the openings 33a of the communication hole 33 in the left side wall 18c. The horizontal tethers 40 and 41 in the illustrated embodiment are generally identical in length and width. The horizontal tethers 40 and 41 limit a clearance between the left side wall 18c and right side wall 18d of the main bag section 17 in order to prevent the main bag section 17 from expanding in such a manner that the left side wall 18c and right side wall 18d are separated from each other unduly in an initial stage of airbag deployment.

Figure 10:
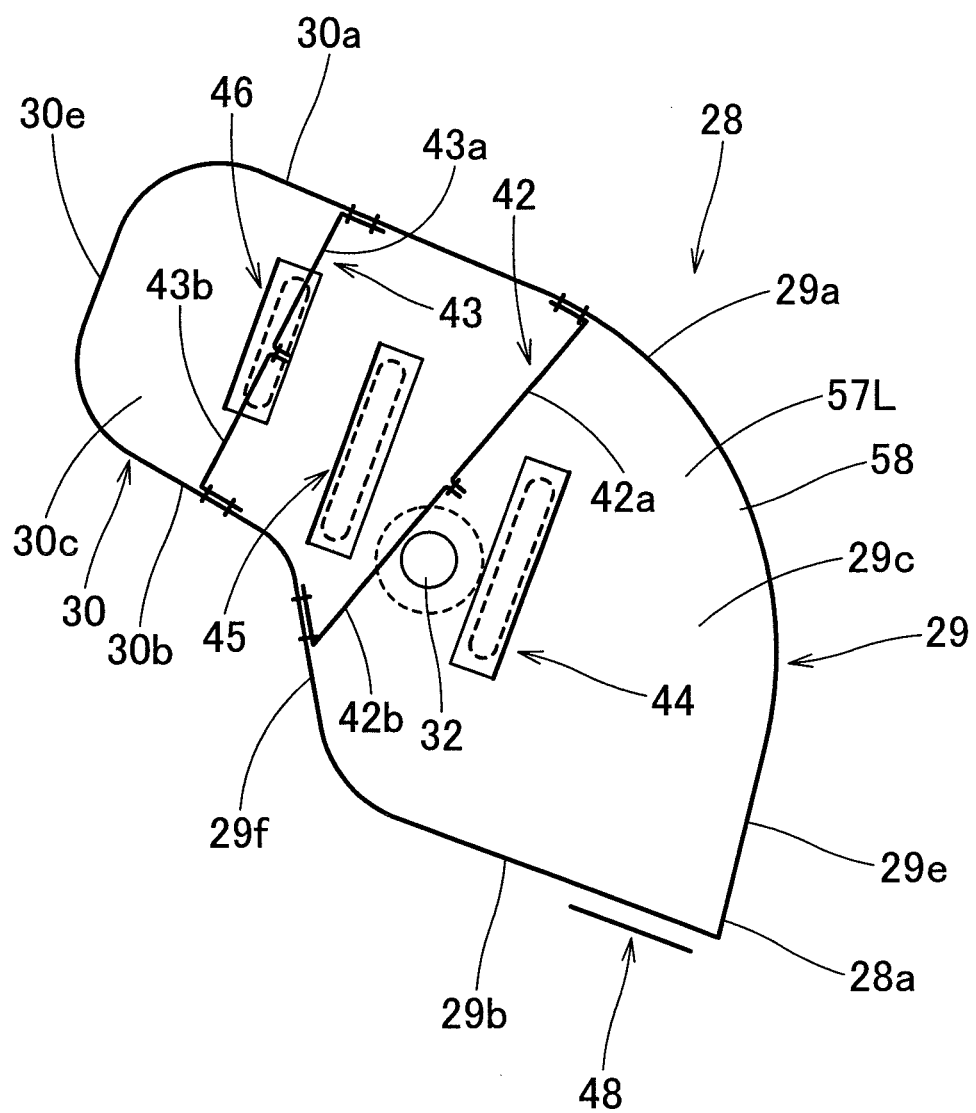
FIG. 10 is a sectional view taken along line X-X in FIG. 8.

Referring to FIGS. 6 and 10, two vertical tethers 42 and 43 are disposed one behind the other inside the protruding region 30, i.e., at the rear end region of the center bag section 28 as fully deployed. Specifically, the front vertical tether 42 is located in a vicinity of the boundary between the protruding region 30 and main body 29 (FIG. 10). Each of the vertical tethers 42 and 43 is formed into such a band that connects the upper side wall 30a and lower side wall 30b of the protruding region 30 and extends generally vertically so the width direction extends generally in a left and right direction. Each of the vertical tethers 42 and 43 is formed by jointing a pair of base materials 42a and 42b/43a and 43b, as shown in FIG. 10. The vertical tethers 42 and 43 are generally identical in length and width. The vertical tethers 42 and 43 limit a clearance between the upper side wall 30a and lower side wall 30b of the protruding region 30 (i.e., the rear end 28b region of the center bag section 28) in order to prevent the rear end 28b region of the center bag section 28 from expanding in such a manner that the upper side wall 30a and lower side all 30b are separated unduly in an initial stage of airbag deployment.

Referring to FIGS. 6 and 8, one of the three left-right tethers 44, 45 and 46 is disposed inside the main body 29, and other two are disposed inside the protruding region 30 of the center bag section 28. Specifically, the foremost left-right tether 44 is located generally at the center in a front and rear direction of the main body 29. The center left-right tether 45 is located at a front end region of the protruding region 30 (in a vicinity of the boundary between the protruding region 30 and main body 29) and proximate to and at the rear of the vertical tether 42. The rearmost left-right tether 46 is located in a rear end region of the protruding region 30, proximate to and at the rear of the vertical tether 43. The left-right tether 44 is a band that connects the left side wall 29c and right side wall 29d of the main body 29 and extends generally along a left and right direction such that the width direction extends generally along an up and down direction. The left-right tether 44 is connected, by the first end, to the inner region 34b of the peripheral area 34 in between the openings 33a of the communication hole 33 in the right side wall 29d (FIG. 8). Each of the left-right tethers 45 and 46 is a band which connects the left side wall 30c and right side wall 30d of the protruding region 30 and extends generally along a left and right direction such that the width direction extends generally along an up and down direction. Each of the left-right tethers 44, 45 and 46 is formed by jointing a pair of base materials 44a and 44b/45a and 45b/46a and 46b, as shown in FIG. 8. In the illustrated embodiment, the foremost left-right tether 44 and center left-right tether 45 are generally identical in length and width. The rearmost left-right tether 46 is slightly smaller in width than the tethers 44 and 45 and has a generally same length as the tethers 44 and 45. The left-right tethers 44, 45 and 46 limit a clearance between the left side walls 29c and 30c and right side walls 29d and 30d of the center bag section 28 in order to prevent the center bag section 28 from expanding in such a manner that left side walls 29c and 30c and right side walls 29d and 30d are separated unduly in an initial stage of airbag deployment.

Figure 11:
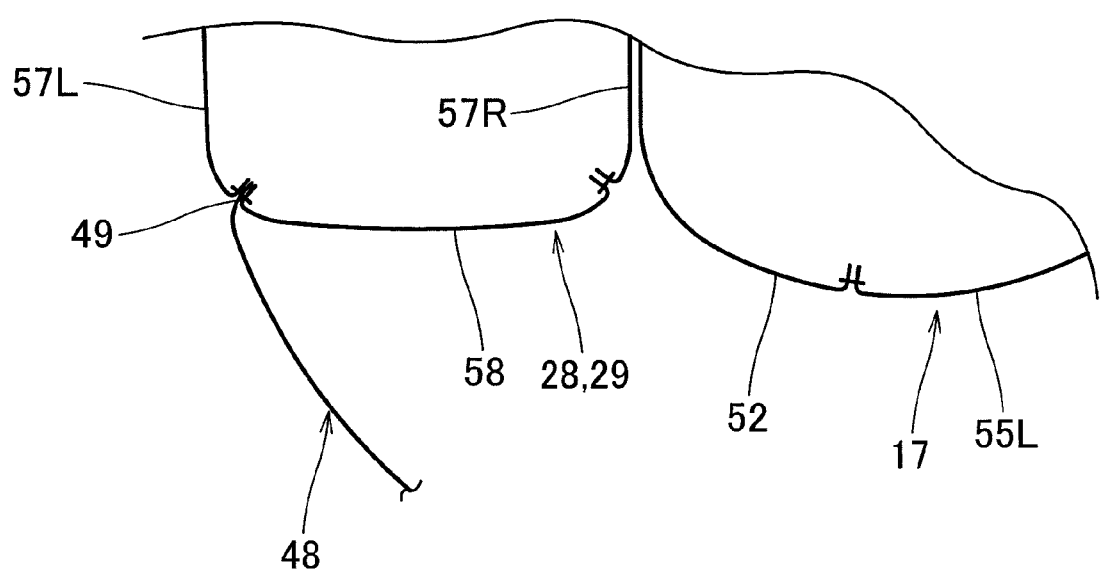
FIG. 11 is a schematic sectional view taken along line XI-XI in FIG. 8.

The outer tether 48 connects the front end 28a of the center bag section 28 as inflated to the case 12. The outer tether 48 is formed into a band extending outward from a front left lower end of the main body 29 of the center bag section 28. The root end 49 of the outer tether 48 is connected to the front left lower end of the main body 29 (FIG. 11). At the leading end 50 of the outer tether 48 are two insert holes 50a for receiving the bolts 9a of the retainer 9, as shown in FIG. 8. More specifically, the root end 49 of the outer tether 48 is disposed at the front lower end of the left side wall 29c of the main body 29, which faces away from the main bag section 17, of the center bag section 28, such that the outer tether 48 extends therefrom. The outer tether 48 includes at the leading end 50 a recessed region 50b which is cut out in a generally semicircle for receiving the main body 8a of the inflator 8, as shown in FIG. 13. The leading end 50 of the outer tether 48 is secured to the bottom wall 12a of the case 12 with the retainer 9L together with the airbag 15 and inflator 8 secured to the bottom wall 12a (FIG. 21). In the illustrated embodiment, the outer tether 48 is deployable at a slant relative to a left and right direction in such a manner as to extend from the front left lower end of the main body 29 toward the mounting region 20 of the main bag section 17 located diagonally forward right, via an underside of the main body 29. A length L1 (FIG. 13) of the outer tether 48 is smaller than a distance between the front left lower end of the main body 29 and the left edge of the mounting region 20 in the airbag 15 as hypothetically inflated by itself.

The bag body 16 is formed into a bag by sewing together circumferential edges of predetermined shaped base cloths. As shown in FIGS. 12 and 13, the bag body 16 of this specific embodiment is composed of an outer left panel 52, an outer right panel 53, an inner left panel 55L and an inner right panel 55R, which constitute the main bag section 17, a left panel 57L, a right panel 57R and a side panel 58, which constitute the center bag section 28, a reinforcing cloth 62 for reinforcing a periphery of the gas inlet port 21 and three protecting cloths 63 for protecting the periphery of the gas inlet port 21 from an inflation gas.

The outer left panel 52 and the outer right panel 53 are formed in such a manner as to split the circumferential wall 18 of the main bag section 17 into left and right, and formed into a generally sectorial contour, respectively, as shown in FIG. 12. The outer left panel 52 includes a projecting region 52a for forming a peripheral area of the gas inlet port 21. The outer left panel 52 constitutes the left side wall 18c, a front half of the left side region of the upper side wall 18a, a left half region of the lower side wall 18b, and a region of the rear side wall 24 on the left side of the top of the raised region 26L. The outer right panel 53 includes a projecting region 53a for forming the peripheral area of the gas inlet port 21. The outer right panel 53 constitutes the right side wall 18d, a front half of the right side region of the upper side wall 18a, a right half region of the lower side wall 18b, and a region of the rear side wall 24 on the right side of the top of the raised region 26R. The outer left panel 52 is provided with openings 52f which form the communication hole 33.

The inner left panel 55L and inner right panel 55R constitute a region of the rear side wall 24 between the tops of the raised regions 26L and 26R. More specifically, the panels 55L and 55R form a region ranging from the rear side of the upper side wall 18a in the circumferential wall 18 to an area of the rear side wall 24 between the tops of the raised regions 26L and 26R, and are configured into a pair of bands each curving generally in a crescent shape such that each panel 55L/55R forms a region from the front end of the recessed area 25 to the top of the left raised region 26L/a region from the front end of the recessed area 25 to the top of the right raised region 26R of the above-described region split up at the front end of the recessed area 25 (FIG. 12). In this specific embodiment, each of the inner left panel 55L and the inner left panel 55R is provided, at the inner circumferential edge 55b, with an extended region 55c that forms the rear section 39 of the front-rear tether 37. In a flattened state, the outer circumferential edges 55a of the inner left panel 55L and inner right panel 55R are identical in curved shape to the rear edges 52d and 53d of the outer left panel 52 and outer right panel 53.

The left panel 57L constitutes a left side region of the center bag section 28 as fully inflated, i.e., the left side wall 29c of the main body 29 and the left side wall 30c of the protruding region 30. The right panel 57R constitutes a right side region of the center bag section 28 as fully inflated, i.e., the right side wall 29d of the main body 29 and the right side wall 30d of the protruding region 30. As shown in FIG. 13, the left panel 57L and right panel 57R are generally identical in outer contour. The right panel 57R is provided with openings 57b which constitute the communication hole 33. The side panel 60 is formed into a band and constitutes the upper side walls 29a and 30a of the main body 29 and protruding region 30, the rear side wall 30e and lower side wall 30b of the protruding region 30, the rear side wall 29f, lower side wall 29b and front wall 29e of the main body 29.

As shown in FIG. 12, the reinforcing cloth 62 for reinforcing the periphery of the gas inlet port 21 is a generally rectangle in outer contour. Each of the protecting cloths 63 is formed into a generally rectangle greater than the reinforcing cloth 62. The protecting cloths 63 cover seams of the base cloths located in the periphery of the gas inlet port 21 (specifically, the seam that sews the front edge 52e of the outer left panel 52 and the seam that sews the front edge 53e of the outer right panel 53, reference numeral omitted) from inside and protect the seam from an inflation gas. The protecting cloths 63 are provided in a three-ply form also for the purpose of reinforcing the periphery of the gas inlet port 21.

In this embodiment, components of the bag body 16, i.e., the outer left panel 52, outer right panel 53, inner left panel 55L, inner right panel 55R, left panel 57L, right panel 57R, side panel 58, reinforcing cloth 62, protecting cloths 63, material 61 forming the front-rear tether 37, base materials 40a, 40b, 41 a and 41 b of the horizontal tethers 40 and 41, base materials 42a, 42b, 43a and 43b of the vertical tethers 42 and 43, base materials 44a, 44b, 45a, 45b, 46a and 46b of the left-right tethers 44, 45 and 46 and outer tether 48 are made of a flexible woven fabric of polyester yarn, polyamide yarn or the like.

The steering wheel 68 located in front of the driver's seat DS, which is on the left of the front passenger seat PS, is provided with an airbag device 71 for a steering wheel. The airbag device 71 includes an airbag 72 for a steering wheel which is stored in a boss section 69 disposed at the center of the steering wheel 68 in an folded-up configuration, and an inflator (not-shown) for feeding the airbag 72 with inflation gas. The airbag 72 is fabricated of a flexible sheet material and inflatable with an inflation gas fed from the inflator to cover the top surface (i.e., rear surface) of the steering wheel 68 entirely. As shown in FIGS. 18 and 19, the airbag 72 is inflatable into a generally disc-like shape having a greater outer diameter than a ring section 70 of the steering wheel 68. The airbag 72 is supported by the ring section 70 on the front surface at deployment. In a similar fashion to the inflator 8 of the airbag device M1 for a front passenger seat, the inflator of the airbag device 71 for a steering wheel is designed to be actuated in the event of a frontal collision, an oblique collision and an offset collision of the vehicle V.

Figure 15A:
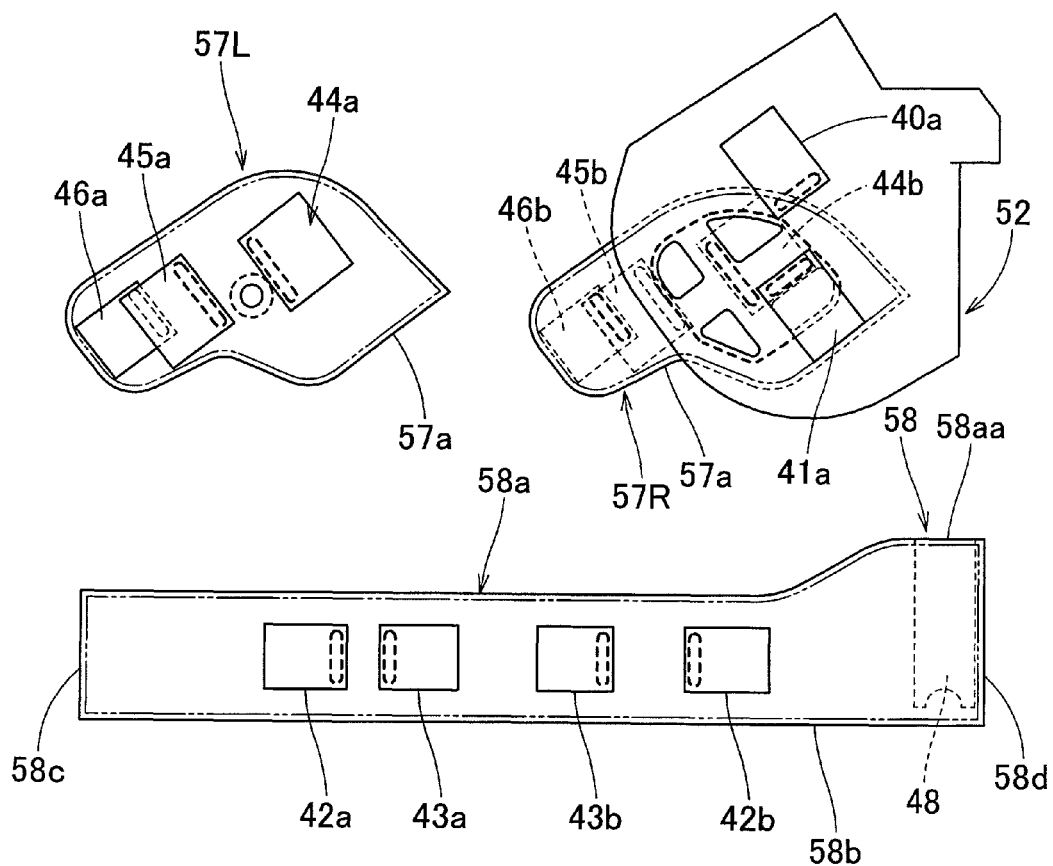
Figure 16A:
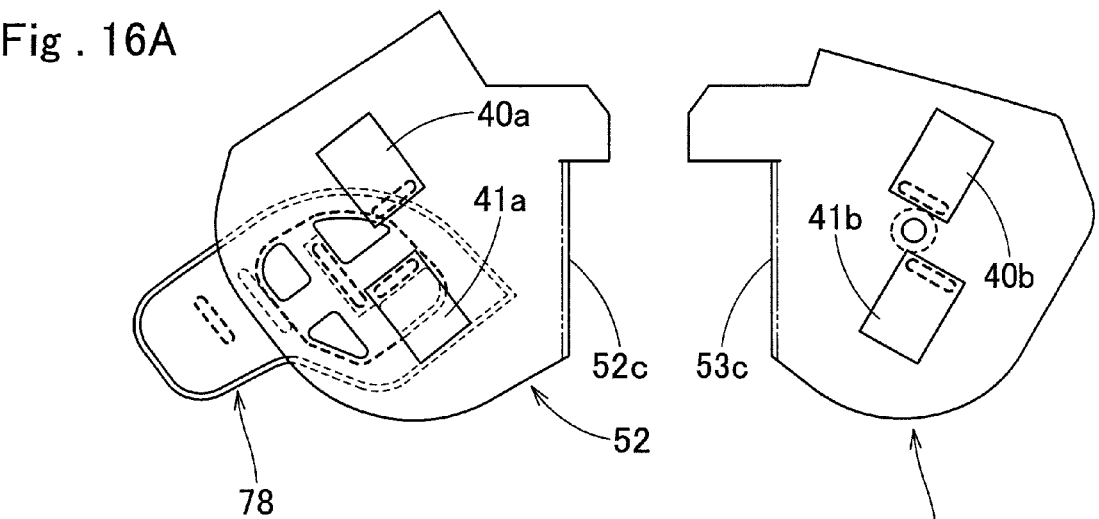
Figure 17A:
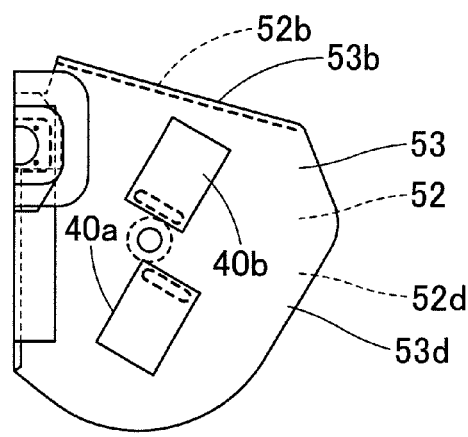
Figure 17B:
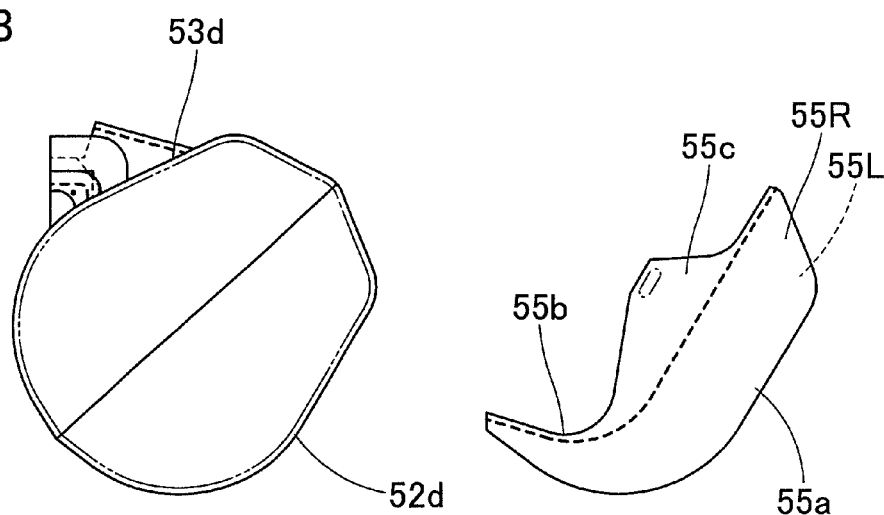

Manufacturing of the airbag 15 is now described. As preparatory steps, first ends of the base materials 44a, 45a and 46a for tethers are sewn to the left panel 57L as shown in FIG. 15A, first ends of the base materials 40b and 41 b for tethers are sewn to the outer right panel 53 as shown in FIG. 16A. Also, first ends of the base materials 42a, 42b, 43a and 43b for tethers are sewn to the side panel 58 as shown in FIG. 15A, and the inner left panel 55L and inner right panel 55R are overlaid one above the other and the inner circumferential edges 55b are sewn together with sewing threads, as shown in FIG. 17B.

Figure 14A:
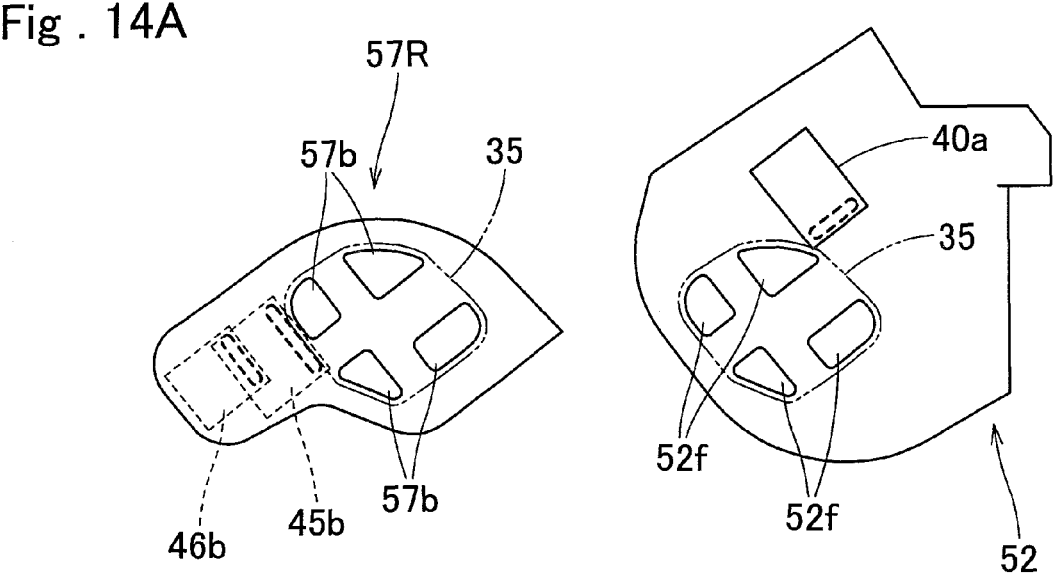
FIGS. 14A to 17C schematically illustrate a manufacturing process of the airbag of the first embodiment.
Figure 14B:
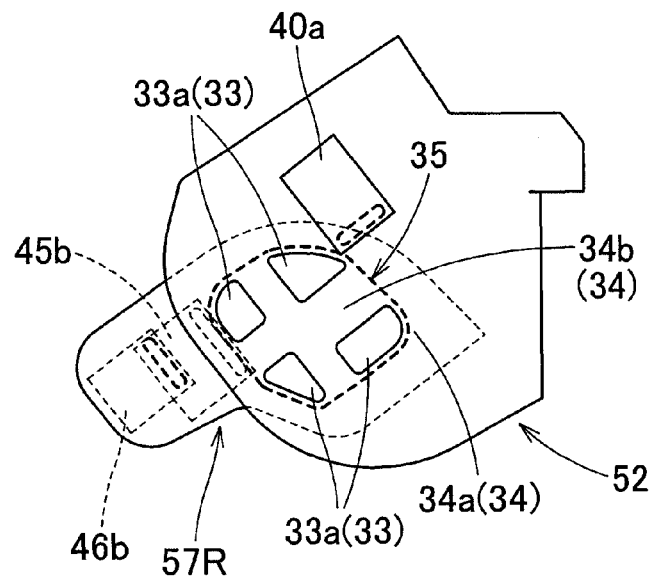
Figure 14C:
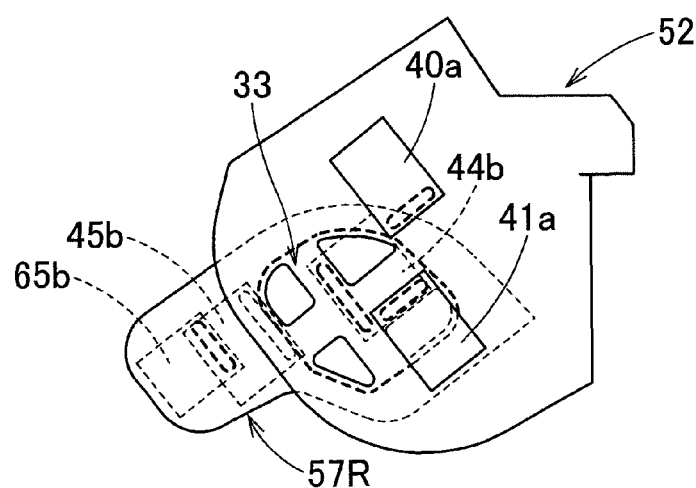
Figure 15B:
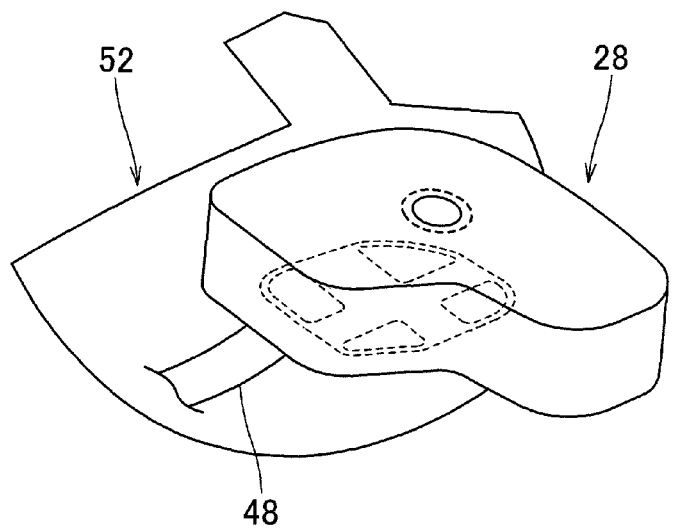

Firstly, as shown in FIG. 14A, first ends of the base materials 45b and 46b for tethers are sewn to an inner surface of the right panel 57R, while a first end of the base material 40a for a tether is sewn to an inner surface of the outer left panel 52. Then the right panel 57R and outer left panel 52 are overlaid one over the other such that the outer surfaces contact each other and positions of the openings 57b and 52f match, and are sewn together at the entire outer region 34a in the peripheral region 34 of the openings 57b and 52f (i.e., of the communication hole 33) with sewing threads, thus forming a sewn portion 35 (FIG. 14B). Then as shown in FIG. 14C, a first end of the base material 44b for a tether is sewn to the inner surface of the right panel 57R and a first end of the base material 41a for a tether is sewn to the inner surface of the outer left panel 52. Subsequently, as shown in FIG. 15A, an outer circumferential edge 57a of the right panel 57R and a right edge 58b of the side panel 58, which is so arranged that the inner surface faces outwardly, are sewn together. Then the side panel 58 is so turned that the left edge 58b faces toward the inner surface of the outer left panel 52, and the left edge 58b is sewn to an outer circumferential edge 57a of the left panel 57L, thus forming the center bag section 28. At this time, the root end 49 of the outer tether 48 is sewn together with the left edge 58a of the side panel 58 and outer circumferential edge 57a of the left panel 57L at the front end 58aa of the left edge 58a of the side panel 58, such that the outer tether 48 is jointed to the front lower end of the left side wall 29c, i.e., to the front end 28a, of the center bag section 28. Then the center bag section 28 is reversed inside out from an unsewn opening provided at the front upper edge 58c and front lower edge 58d of the side panel 58 so seam allowances may not appear outside, and then the outer left panel 52 is flattened. With the aid of the unsewn opening, second ends of the base materials 42a, 42b, 43a and 43b for tethers are joined together to form the vertical tethers 42 and 43 as well as corresponding second ends of the base materials 44a, 44b, 45a, 45b, 46a and 46b for tethers are joined together to form the left-right tethers 44, 45 and 46. If then the front upper edge 58c and front lower edge 58d of the side panel 58 are sewn together with sewing threads, the center bag section 28 is completed as shown in FIG. 15B.

Figure 16B:
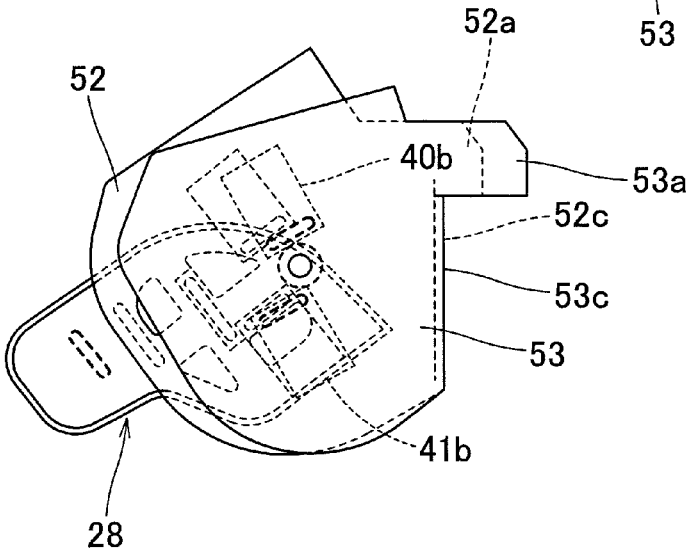
Figure 16C:
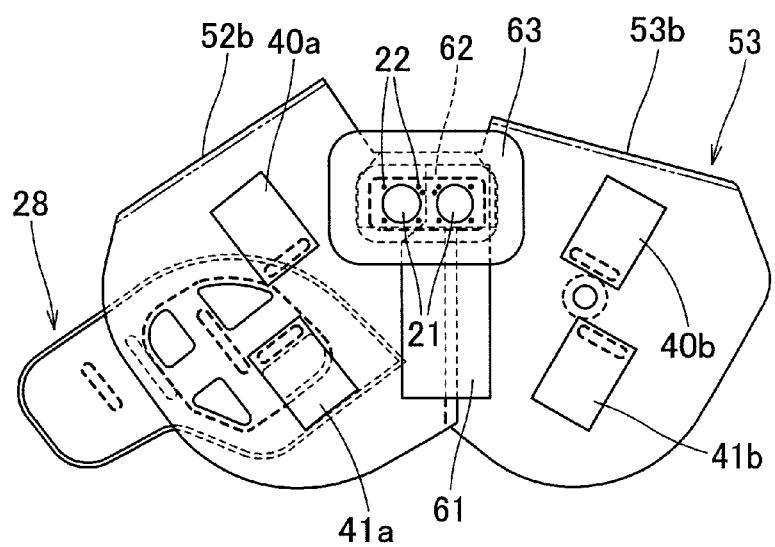
Figure 17C:
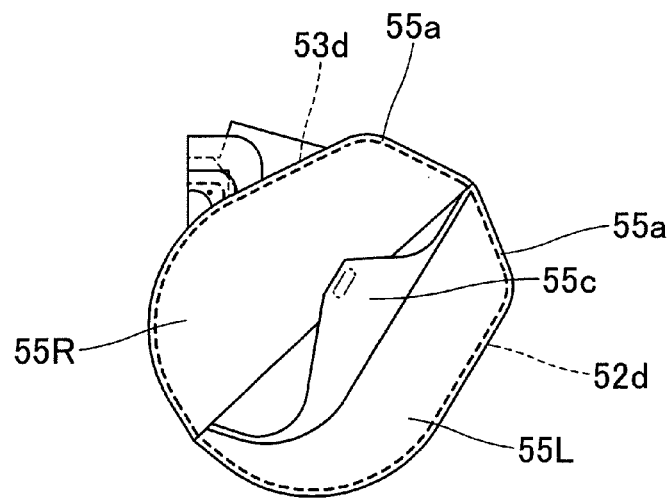

Then as shown in FIGS. 16A and 16B, the outer right panel 53 is laid over the outer left panel 52 in a flattened state so the outer surfaces contact each other, and the lower edges 52c and 53c are sewn together. Subsequently, the outer left panel 52 and outer right panel 53 are opened about the seam of the lower edges 52c and 53c into a flat state while having the projecting regions 52a and 53a overlaid one above the other. Then the reinforcing cloth 62, the material 61 forming the front-rear tether 37 and the protecting cloths 63 are placed over the inner surfaces of projecting regions 52a and 53a in order, and sewn to the projecting regions 52a and 53a at a position to be a periphery of the gas inlet port 21. Thereafter, the gas inlet port 21 and mounting holes 22 are punched out as shown in FIG. 16C. Then the outer left panel 52 and outer right panel 53 are overlaid one above the other again so the outer surfaces contact each other, and the upper edges 52b and 53b are sewn together as shown in FIG. 17A. Then as shown in FIG. 17B, the outer left panel 52 and outer right panel 53 are opened so that the rear edges 52d and 53d are separated from each other, and the rear edge 52d of the outer left panel 52 and the outer circumferential edge 55a of the inner left panel 55L, and the rear edge 53d of the outer right panel 53 and the outer circumferential edge 55a of the inner right panel 55R are respectively sewn together, thus completing the main bag section 17 in a bag shape, as shown in FIG. 17C.

Thereafter, the rear end 38c of the front section 38 is sewn to the front end 39a of the rear section 39 to form the front-rear tether 37, and corresponding second ends of the base materials 40a, 40b, 41 a and 41 b are jointed together to form the horizontal tethers 40 and 41. Then the main bag section 17 is reversed inside out from an unsewn region at the front edges 52e and 53e of the outer left panel 52 and outer right panel 53 such that seam allowances may not appear outside. If then the front edges 52e and 53e are sewn up with sewing threads, the airbag 15 is completed.

When the airbag 15 is completed, the retainers 9 are housed inside the airbag 15, and then the airbag 15 is folded up to be housed in the case 12. At this time, the bolts 9a of the retainer 9L are put through the insert holes 50a formed at the leading end 50 of the outer tether 48 as well. Then a tearable wrapping sheet is wrapped around the airbag 15 for keeping the folded-up configuration. Then the airbag 15 is placed on the bottom wall 12a of the case 12, and the main body 8a of each of the inflators 8 is set in the case 12 from the lower side of the bottom wall 12a, such that the bolts 9a projecting downwardly from the bottom wall 12a are put through the flange 8c of each of the inflators 8. If then the bolts 9a projecting out of the flange 8c of each of the inflators 8 are fastened with nuts 10, the airbag 15 and the inflators 8 are mounted on the bottom wall 12a of the case 12 as well as the leading end 50 of the outer tether 48.

Thereafter, the circumferential wall 12b of the case 12 is attached to the joint wall 6c of the airbag cover 6 on the dashboard 1, which has been mounted on board, and the unillustrated bracket of the case 12 is secured to the vehicle body structure. Thus the airbag device M1 is mounted on the vehicle.

After the airbag device M1 for a front passenger seat of the first embodiment is mounted on the vehicle V, in the event of a frontal collision, an oblique collision or an offset collision of the vehicle V, the inflators 8 discharge an inflation gas from the gas discharge ports 8b to inflate the airbag 15. Then the airbag 15 pushes and opens the doors 6a and 6b of the airbag cover 6, protrudes out of the case 12 via an opening formed by the opening of the doors 6a and 6b, and is deployed upward and rearward in such a manner as to fill up a space between the top plane 2 of the dashboard 1 and the windshield 4, as indicated by double-dotted lines in FIGS. 1 to 3 and as shown in FIGS. 18 to 20. At the same time, the airbag 72 for a steering wheel is also inflated with an inflation gas and is deployed over the top surface (i.e., rear surface) of the steering wheel 68 (FIGS. 18 and 19).

In the airbag device M1 for a front passenger seat of the first embodiment, as shown in FIGS. 19 to 21, the outer tether 48 disposed outside of the airbag 15 connects the front end region 28a of the center bag section 28, which is so deployable as to extend rearward from a side of the case or housing 12, to a vicinity of the case 12 at airbag deployment. The outer tether 48 will prevent the center bag section 28 from protruding obliquely rearward considerably out of the case 12 in an initial stage of airbag deployment, and also prevent the front end region 28a of the center bag section 28 from expanding in a vehicle width direction. Accordingly, the outer tether 48 will prevent such subsequent rebounding behavior of the center bag section 28 that would shrink forward while expanding in a width direction and oscillate repeatedly in a front and rear direction while inflating. As a result, the airbag 15 will form a fully deployed contour quickly. In the first embodiment, especially, the center bag section 28 includes the protruding region 30 which will deploy the rear end region 28b of the center bag section 28 rearward relative to the main bag section 17. Although this configuration seems likely to let the center bag section 28 protrude obliquely rearward considerably in an initial stage of deployment, the outer tether 48 will prevent the center bag section 28 from oscillating or bounding back and forth repeatedly while unfurling, and will help inflate the airbag 15 to a fully deployed contour quickly.

Therefore, the airbag device M1 for a front passenger seat of the first embodiment is capable of inflating the airbag 15 with a center bag section 28 deployable in a space between the driver's seat DS and front passenger seat PS into a fully deployed contour quickly.

With the protruding region 30 which will deploy the rear end region 28b of the center bag section 28 rearward relative to the main bag section 17, the airbag device M1 of the first embodiment will protect a passenger MP in the front passenger seat PS adequately in such an instance where the passenger MP moves diagonally forward left (forward and toward the center in a left and right direction) in the event of an oblique collision or an offset collision of the vehicle V. The protruding region 30 will also protect the driver MD in the driver's seat DS moving diagonally forward right (forward and toward the center in a left and right direction).

In the airbag device M1 of the first embodiment, the main bag section 17 internally includes the front-rear tether 37 which connects the mounting region 20 disposed at the front end region 17a of the main bag section 17 as fully inflated and the rear side wall 24 deployable at the rear end of the main bag section 17. The front-rear tether 37 will prevent the main bag section 17 from unfurling in such a manner that the rear side wall 24 protrudes rearward considerably in an initial stage of airbag deployment, and will help inflate the airbag 15 into a fully deployed contour even more quickly while suppressing an oscillating behavior of the airbag 15 in a front and rear direction. Further, the center bag section 28 internally includes the vertical tethers 42 and 43 which connect the upper side wall 30a and lower side wall 30b of the center bag section 28 opposing in an up and down direction at airbag inflation. The vertical tethers 42 and 43 will prevent the center bag section 28 from inflating in such a manner as to expand in an up and down direction when the center bag section 28 moves forward after protruding rearward in an initial stage of airbag deployment, and will prevent the center bag section 28 from oscillating while swelling and contracting in an up and down direction, thus help inflate the airbag 15 into a fully deployed contour quickly. Especially, the vertical tethers 42 and 43 are disposed in the protruding region 30 which is located at the rear end region 28*b* of the center bag section 28 as fully deployed and farthest from the case 12 and thus is likely to protrude upward, the tethers 42 and 43 will prevent the rear end region of the center bag section 28 from protruding upward considerably.

In the first embodiment, moreover, the center bag section 28 further internally includes the left-right tethers 44, 45 and 46 which connect together the left side walls 29*c* and 30*c* and right side walls 29*d* and 30*d* opposing in a left and right direction at airbag inflation. The left-right tethers 44, 45 and 46 will prevent the center bag section 28 from inflating while repeatedly swelling and contracting in a left and right direction, and help inflate the airbag 15 into a fully deployed contour quickly. The tethers 44, 45 and 46 will also limit a volume of the center bag section 28 at inflation.

The second embodiment of the invention is now described. Referring to FIGS. 22 to 27, an airbag 75 according to the second embodiment includes a bag body 76 inflatable with an inflation gas, tethers 37A, 94, 95, 96, and 97 disposed inside the bag body 76 for controlling the contour of the bag body 76 as fully inflated and an outer tether 99 which connects a front end of a later-described center bag section 91 of the bag body 76 (specifically, the left front end 77*a* of the main inflatable region 77) as fully inflated to the case 12. As described later, in the second embodiment, a main bag section 90 and a center bag section 91 are composed of a right region and a left region of a main inflatable region 77, respectively, and are provided in an integrated fashion.

The bag body 76 is fabricated of a flexible sheet material and includes a main inflatable region 77 and a projecting inflatable region 86 which is deployable in such a manner as to project rearward out of a rear surface of the main inflatable region 77 as shown in FIGS. 22 to 25.

The main inflatable region 77 is designed to deploy in such a manner as to fill up a space between the top plane 2 of the dashboard 1 and the windshield 4 and includes at the right front end a mounting region 80 secured to the case 12. Secured to the case 12 at the right front end, the main inflatable region 77 is designed to be thrown out toward the left (i.e., toward the driver's seat DS) considerably. The main inflatable region 77 includes a rear side wall 84 deployable at the rear side to face a passenger MP and a circumferential wall 78 extending forward from a peripheral edge of the rear side wall 84 while tapering in a dimension in an up and direction and converging at the front end.

Figure 24:
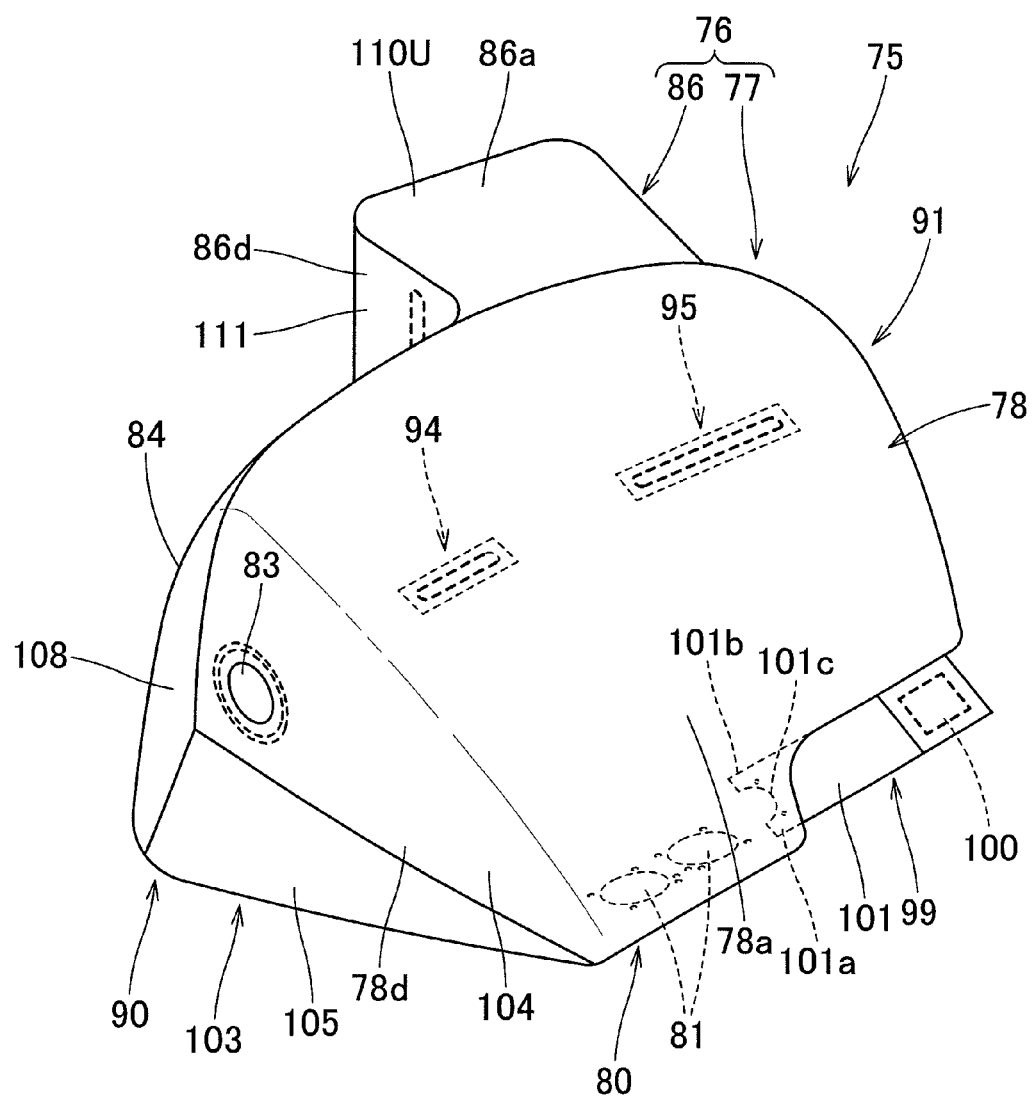
FIG. 24 is a perspective view of the airbag of FIG. 22 as inflated by itself, viewed from right front direction.
Figure 25:
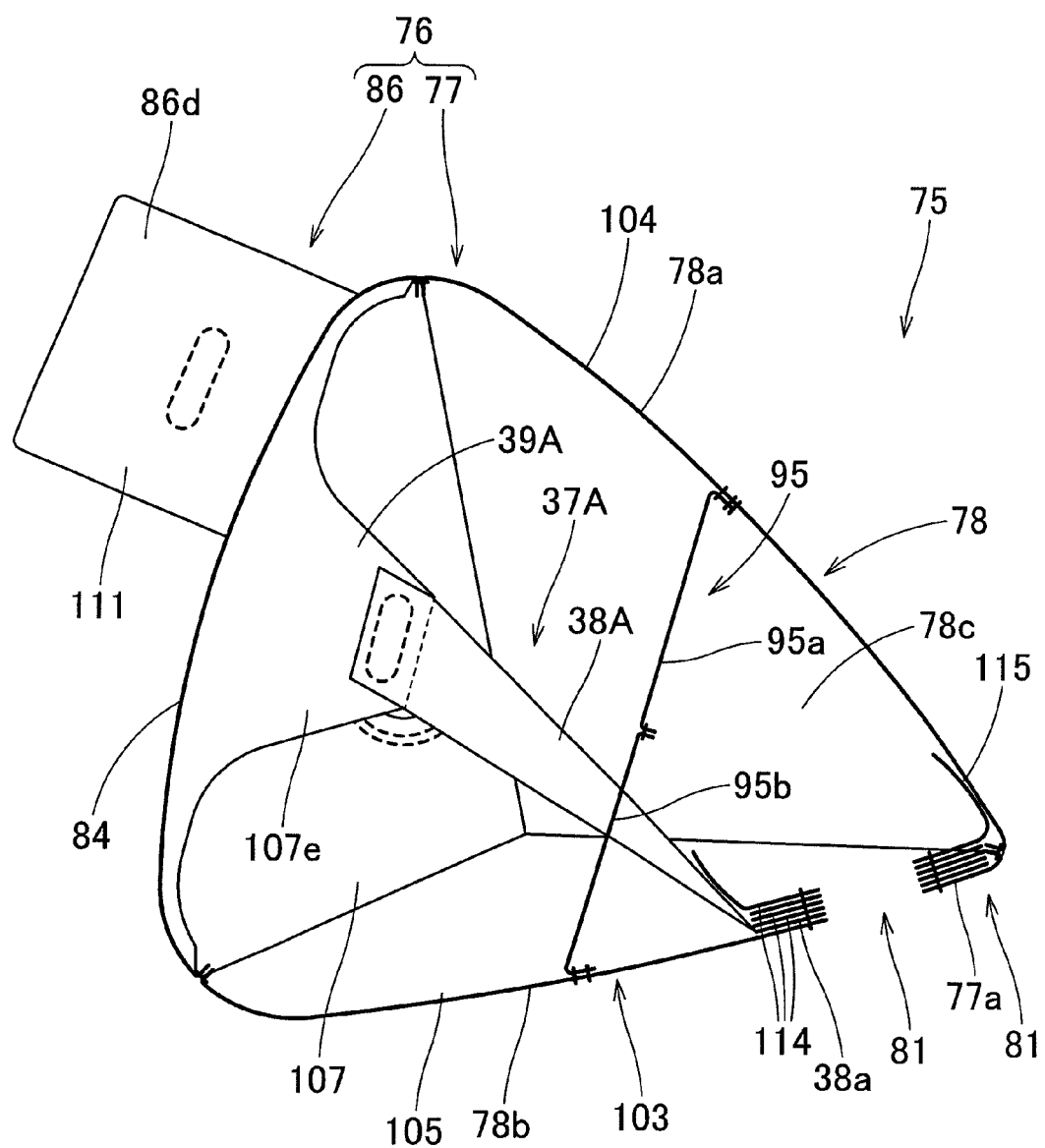
FIG. 25 is a schematic vertical section of the airbag of FIG. 22.
Figure 26:
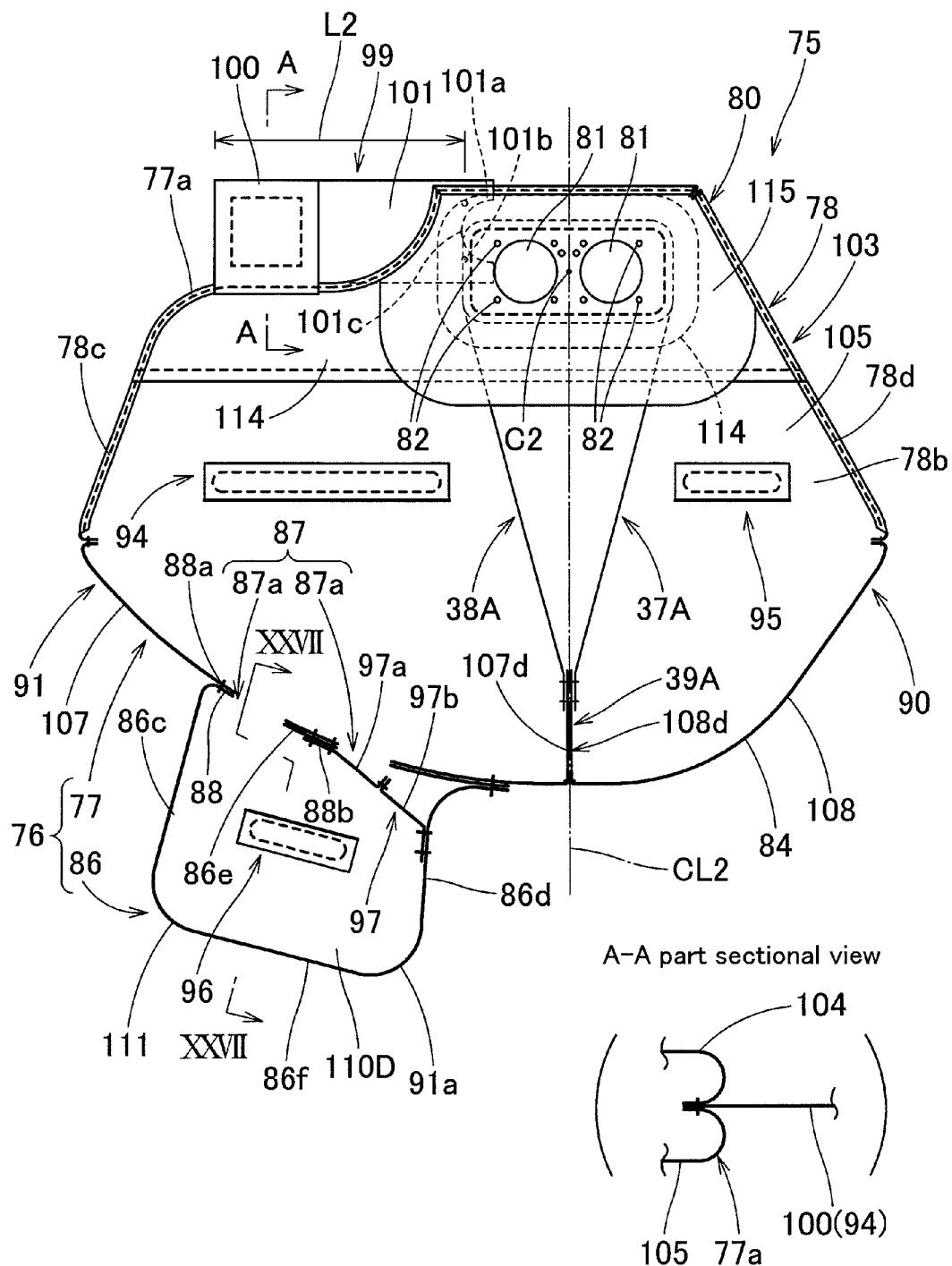
FIG. 26 is a schematic horizontal section of the airbag of FIG. 22.
Figure 37:
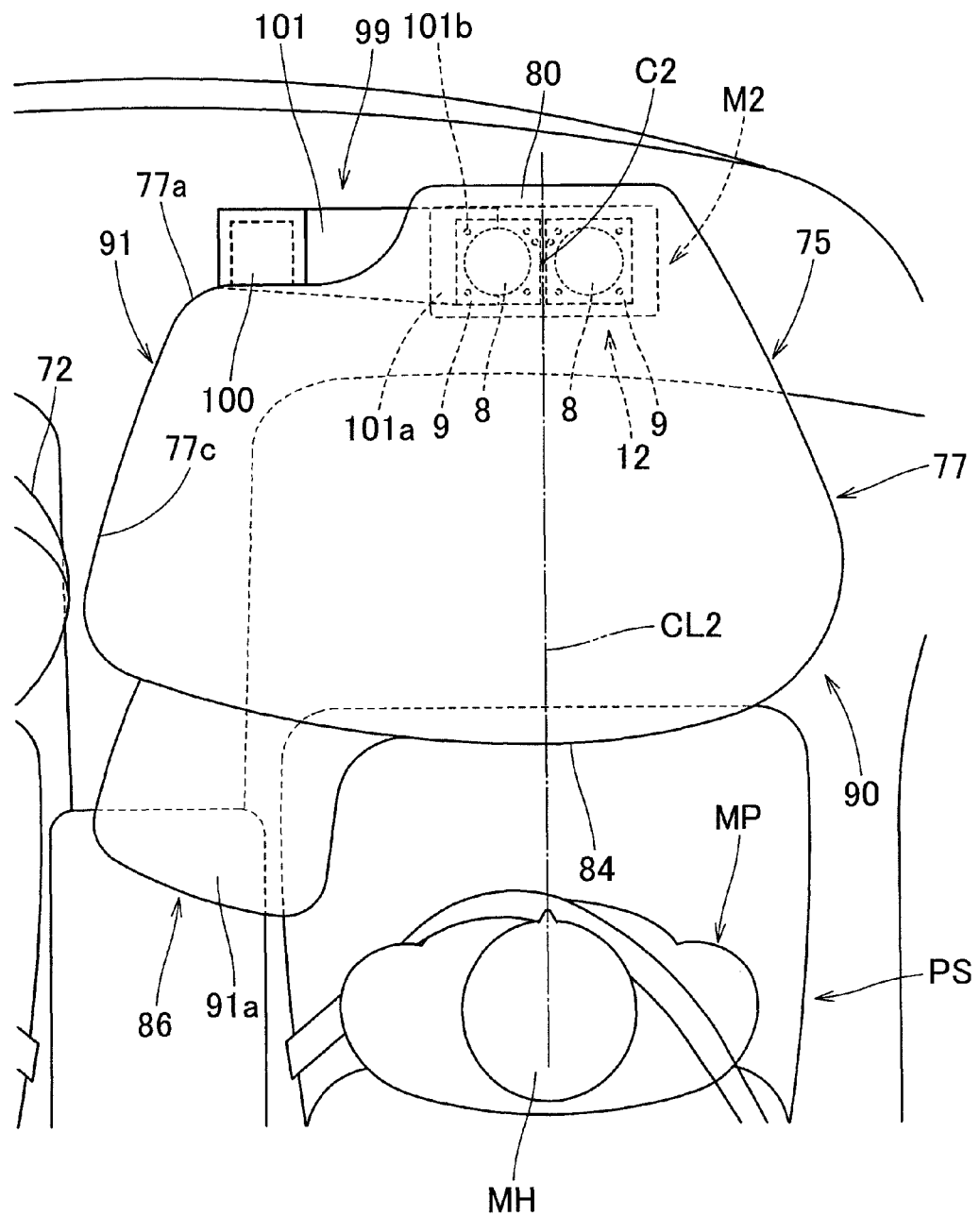
FIG. 37 is a schematic plan view of the airbag device of the second embodiment as the airbag is deployed.

The circumferential wall 78 is so deployable as to fill up mainly a space between the top plane 2 of the dashboard 1 and the windshield 4, and includes an upper side wall 78*a* and a lower side wall 78*b* extending generally along a left and right direction on upper and lower sides, and a left side wall 78*c* and a right side wall 78*d* extending generally along a front and rear direction at left and right sides. As shown in FIGS. 24 and 26, a mounting region 80 at which the airbag 75 is mounted on the case 12 is formed at the right front end of the circumferential wall 78 at airbag deployment in such a manner as to protrude forward partially from the airbag 75 as inflated by itself. The mounting region 80 is designed to stay inside the case 12 at airbag deployment, as shown in FIG. 38, and is provided, at its underside (i.e., on the lower side wall 78*b*), with two, generally round, gas inlet ports 81 disposed side by side in a left and right direction for introducing an inflation gas, as shown in FIGS. 24 to 26. In a periphery of each of the gas inlet ports 81 are four mounting holes 82 for receiving bolts 9*a* of a retainer 9 to secure the periphery of each of the gas inlet ports 81 to a bottom wall 12*a* of a case 12 as shown in FIG. 26. As shown in FIGS. 26 and 37, the airbag 75 is mounted on the vehicle V such that the center in a left and right direction of the mounting region 80 (the center between the centers of the gas inlet ports 81, which will be called hereinafter a mounting center C2) coincides with the center in a left and right direction of the front passenger seat PS. The circumferential wall 78 is provided, on each of the left side wall 78*c* and right side wall 78*d*, a vent hole 83.

The airbag 75 is so designed that a region deployable on the left side of a center line CL2 which runs through the mounting center C2 and extends in a front and rear direction is greater than a region deployable on the right side of the center line CL2 so as to bulge more toward the left (i.e., toward the driver's seat DS) than toward the right. At airbag deployment, the left side wall 77*c* of the circumferential wall 78 deployable toward the driver's seat DS is deployed proximate an airbag 72 for a steering wheel as fully deployed (FIG. 37).

The rear side wall 84 is deployable generally vertically at the rear side of the airbag 75 to face a passenger MP. More specifically, the rear side wall 84 is so deployable slightly at a slant relative to an up and down direction that the lower end is disposed more rearward relative to the upper end. The rear side wall 84 includes at the left upper region a projecting inflatable region 86 which projects rearward at airbag deployment.

Figure 27:
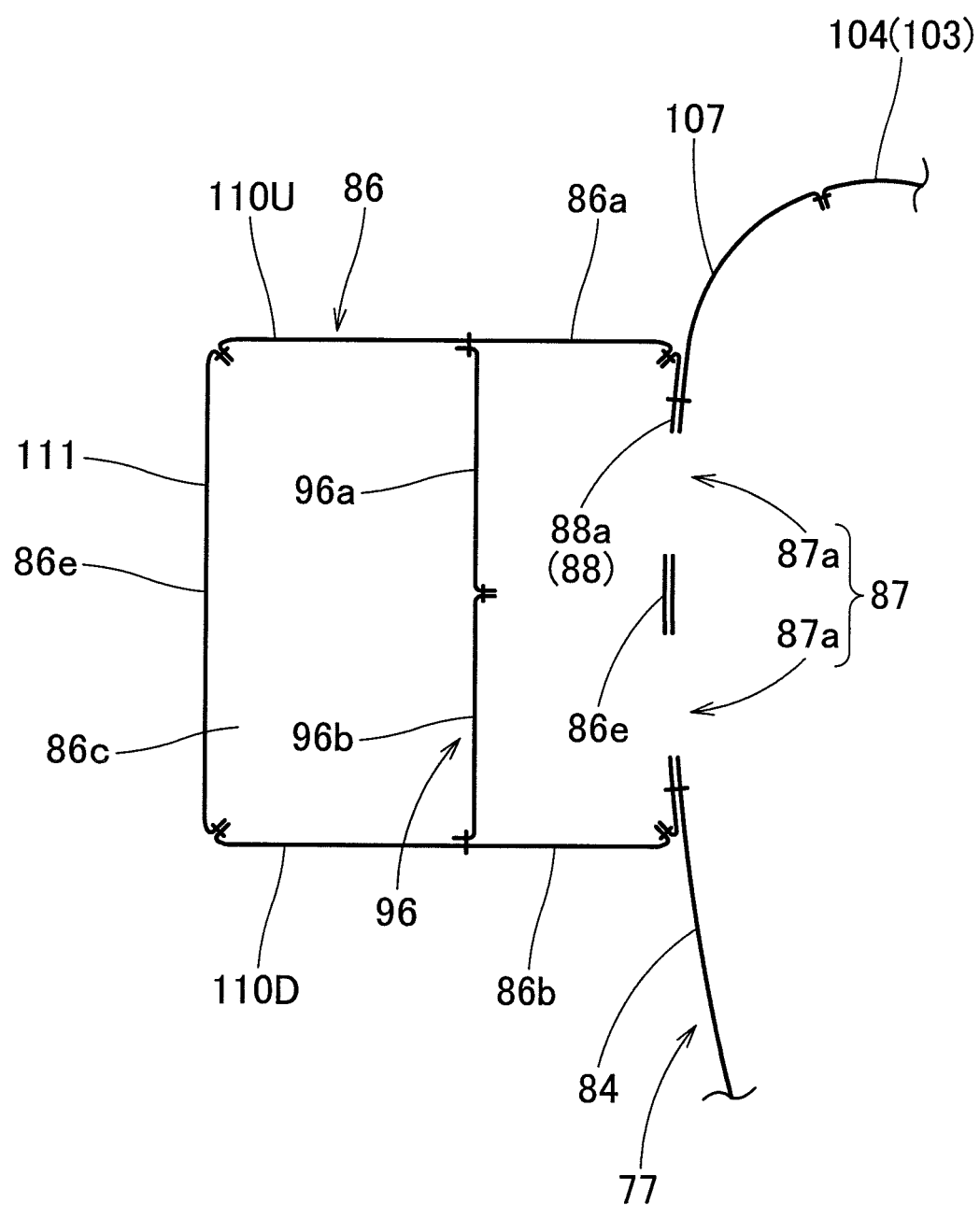
FIG. 27 is a sectional view taken along line XXVII-XXVII in FIG. 26.

The projecting inflatable region 86 is in gas communication with the main inflatable region 77 via a communication hole 87 which is formed through the rear side wall 84 and a front wall 86*e* of the projecting inflatable region 86 at the front end of the projecting region 86 as fully deployed, as shown in FIGS. 22, 23, 36 and 37 so as to admit inflation gas from the communication hole 87. The projecting inflatable region 86 includes an upper side wall 86*a* and a lower side wall 86*b* extending generally along a left and right direction on upper and lower sides, a left side wall 86*c* and a right side wall 86*d* extending generally along a front and rear direction at left and right sides, and a front wall 86*e* and a rear wall 86*f* extending generally along a left and right direction at the front and rear. The communication hole 87 is formed on the front wall 86*e* and is composed of four generally rectangular openings 87*a* disposed side by side and one above the other. The front wall 86*e* is sewn to the rear side wall 84 of the main inflatable region 77 by an entire outer region 88*a* of a peripheral region 88 of the communication hole 87, thus the projecting inflatable region 86 is jointed with the main inflatable region 77 (FIGS. 26 and 27). As shown in FIG. 26, the right side wall 86*d* of the projecting inflatable region 86 is so formed, in a vicinity of the boundary with the rear side wall 84 of the main inflatable region 77, as to continue to the rear side wall 84 smoothly while curving gently.

Figure 36:
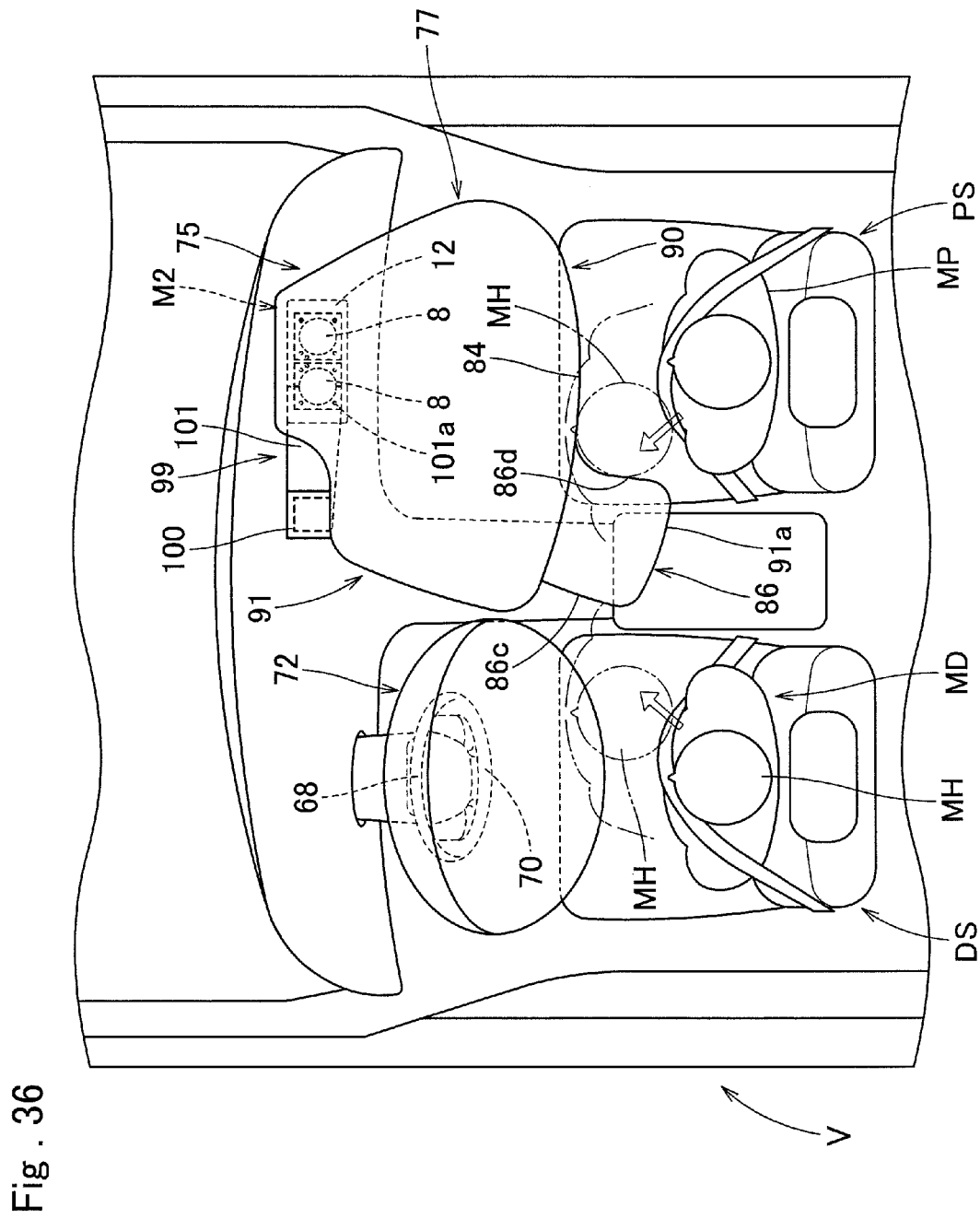
FIG. 36 is a schematic plan view of the airbag device of the second embodiment as the airbag is deployed.

As shown in FIG. 26, in a horizontal section taken in a front and rear direction of the airbag 75 as inflated, the projecting inflatable region 86 is located in a region on the left of the center line CL2 running through the mounting center C2 and extending in a front and rear direction (i.e., in a region to the driver's seat DS), away from the center line CL2. The width in a left and right direction of the projecting inflatable region 86 as inflated is about half of a width in a left and right direction of the main inflatable region 77 as inflated, and the dimension in an up and down direction of the projecting inflatable region 86 as inflated is about ⅗ of a dimension in an up and down direction of a region of the main inflatable region 77 as inflated in a vicinity of the rear side wall 84. The projecting inflatable region 86 is so deployable as to protrude rearward relative to the airbag 72 for a steering wheel as deployed. Moreover, the projecting inflatable region 86 is deployable diagonally forward left of a head MH of a passenger MP seated in the front passenger seat PS as shown in FIGS. 36 and 37. The projecting inflatable region 86 is provided to protect the head MH of a passenger MP or of a driver MD seated in the driver's seat DS in the event of an oblique collision or an offset collision of the vehicle V, and a protruding amount from the rear side wall 84 and the dimension in an up and down direction of the projecting inflatable region 86 are so designed as to be capable of cushioning the head MH as the passenger MP or driver MD moves diagonally forward. That is, the projecting inflatable region 86 is so designed as to cushion the head MH of a passenger MP in the front passenger seat PS with the right side wall 86d deployable on the right side and cushion the head MH of the driver MD in the driver's seat DS with the left side wall 86c deployable on the left side (FIG. 36).

In the airbag 75, a region of the main inflatable region 77 deployable on the right side and including the mounting region 80 constitutes the main bag section 90 which is deployable in front of a passenger MP in the front passenger seat PS, and a left region of the main inflatable region 77 at airbag deployment and the projecting inflatable region 86 constitute the center bag section 91 which is deployable toward an inboard direction (toward the left, in the illustrated embodiment) of the main bag section 91 in a width direction of the vehicle such that the rear end 91a of the center bag section 91 is located rearward relative to the main bag section 90 at deployment.

The bag body 76 internally includes five tethers 37A, 94, 95, 96 and 97, as shown in FIGS. 25 to 27, more specifically, a front-rear tether 37A connecting a vicinity of the gas inlet port 81 and rear side wall 84 in the main inflatable region 77, two vertical tethers 94 and 95 connecting the upper side wall 78a and lower side wall 78b of the main inflatable region 77, a vertical tether 96 and a regulating tether 97 disposed inside the projecting inflatable region 86.

As shown in FIG. 26, the front-rear tether 37A is disposed on the center line CL2 which passes through the mounting center C2 and extends in a front and rear direction at airbag deployment. The front rear tether 37A has a similar configuration to the front-rear tether 37 in the airbag 15 of the first embodiment except in an outer contour of a material 61A for forming a front section 38A, and therefore, a detailed description of the tether 37A will be omitted, and "A" will be assigned to the end of reference numerals of common members.

As shown in FIG. 26, the vertical tethers 94 and 95 are disposed side by side in a left and right direction and on both sides of the front-rear tether 37A, at the same positions in a front and rear direction. Each of the vertical tethers 94 and 95 is formed into such a band that connects the upper side wall 78a and lower side wall 78b of the main inflatable region 77 and extends generally vertically so the width direction extends generally in a left and right direction. Each of the vertical tethers 94 and 95 is formed by jointing a pair of base materials 94a and 94b/95a and 95b, as shown in FIG. 25. Since the main inflatable region 77 is designed to be thrown out more toward the left than toward the right, the vertical tether 94 located on the left side of the front-rear tether 37A (i.e., in an area of the center bag section 91) is greater in width in a left and right direction than the vertical tether 95 located on the right side of the front-rear tether 37A (i.e., in an area of the main bag section 90). More specifically, the width in a left and right direction of the vertical tether 94 is about four times of that of the vertical tether 95. The vertical tethers 94 and 95 limit a clearance between the upper side wall 78a and lower side wall 78b of the main inflatable region 77 in order to prevent the main inflatable region 77 (i.e., the main bag section 90 and center bag section 91) from expanding in such a manner that the upper side wall 78a and lower side all 78b are separated unduly in an initial stage of airbag deployment.

Referring to FIGS. 26 and 27, the vertical tether 96 is formed into such a band that connects the upper side wall 86a and lower side wall 86b of the projecting inflatable region 86 and extends generally vertically so the width direction extends generally in a left and right direction. The vertical tether 96 of the illustrated embodiment is so provided as to connect a generally center of the upper side wall 86a and a generally center of the lower side wall 86b at airbag deployment, and is formed by jointing a pair of base materials 96a and 96b. The vertical tether 96 limits a clearance between the upper side wall 86a and lower side wall 86b of the projecting inflatable region 86 which constitutes a rear end region 91a of the center bag section 91 in order to prevent the projecting inflatable region 86 located at the rear end region 91a of the center bag section 91 from expanding in such a manner that the upper side wall 86a and lower side all 86b are separated unduly in an initial stage of airbag deployment.

As shown in FIG. 26, the regulating tether 97 is so provided at a slant relative to a front and rear direction as to connect the front wall 86e and right side wall 86d of the projecting inflatable region 86. The regulating tether 97 of the illustrated embodiment is formed into such a band that connects a generally center in a left and right direction of the front wall 86e and a generally center in a front and rear direction of the right side wall 86d at airbag deployment so the width direction extends generally in an up and down direction. The front end of the regulating tether 97 is sewn to an inner region 88b of the peripheral area 88 between the openings 87a of the communication hole 87 disposed side by side in a left and right direction. The regulating tether 97 is formed by jointing a pair of base materials 97a and 97b. The regulating tether 97 helps form a curved contour of the front end region of the right side wall 86d of the projecting inflatable region 86 at airbag deployment.

Figure 28:
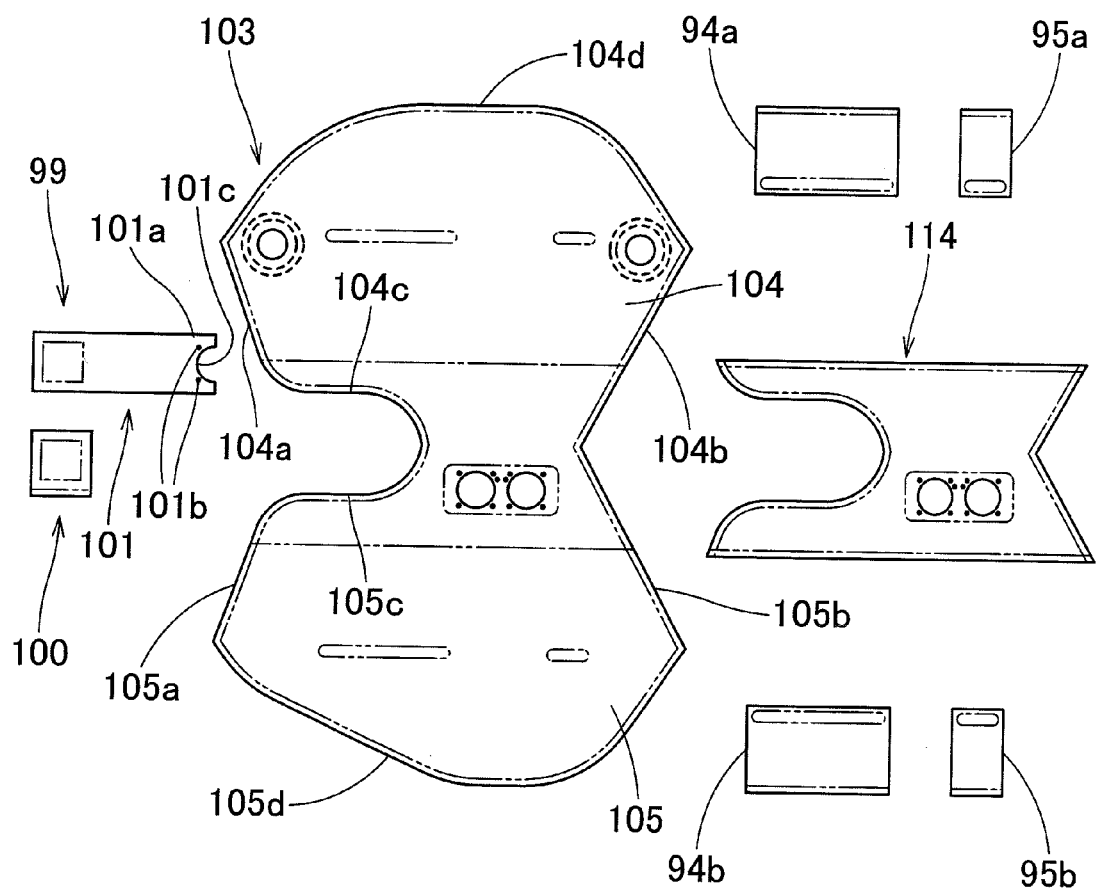
FIGS. 28 and 29 depict base cloths of the airbag of the second embodiment by plan views.
Figure 28:
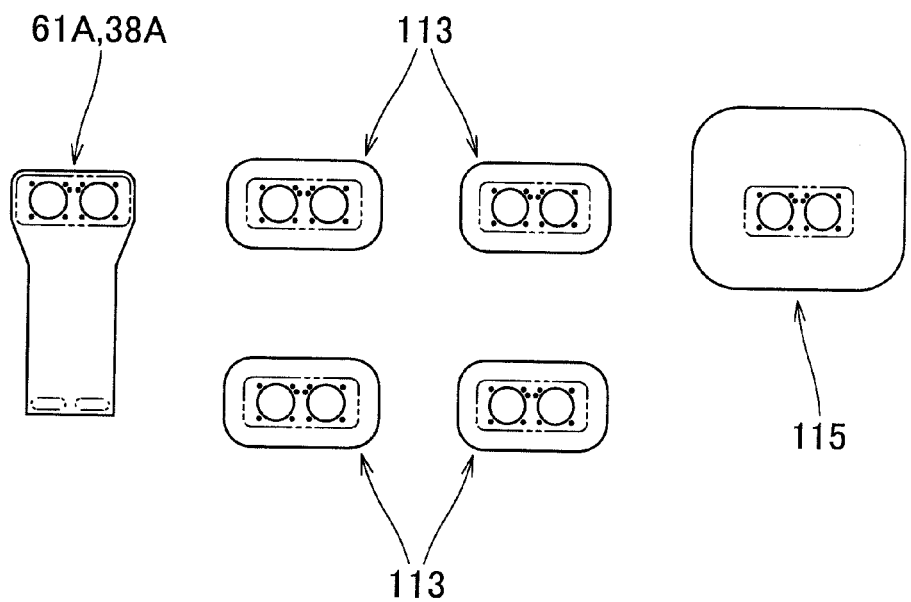

As shown in FIG. 26, the outer tether 99 for connecting the front end of the center bag section 91 to the case 12 at airbag deployment extends forward from the left front end 77a of the main inflatable region 77 (i.e., from the front end of the center bag section 91). In the illustrated embodiment, the outer tether 99 is made of a flexible, band-shaped cloth material and includes a vertical section 100 which extends forward from the left front end 77a of the main inflatable region 77 and a horizontal section 101 which extends along a left and right direction toward the right from the front end region of the vertical section 100. The horizontal section 101 includes at the leading end 101a (i.e., at the right end) a recessed region 101c which is cut out in a generally semi-circle for receiving a main body 8a of the inflator 8 and two insert holes 101b for receiving bolts 9a of a retainer 9L, as shown in FIG. 28. The leading end 101a of the outer tether 99 is secured to the bottom wall 12a of the case 12 with the retainer 9L, which is located on the left side, together with the airbag 75 and inflator 8 secured to the bottom wall 12a (FIG. 38). In the illustrated embodiment, the outer tether 99 is deployable generally along a left and right direction in front of the left region of the main inflatable region 77 (i.e., in front of the center bag section 91). The length L2 (FIG. 26) of the outer tether 99 is smaller than a distance between the left front end 77a of the main inflatable region 77 and the left edge of the mounting region 80 of the airbag 75 as hypothetically inflated by itself.

Figure 29:
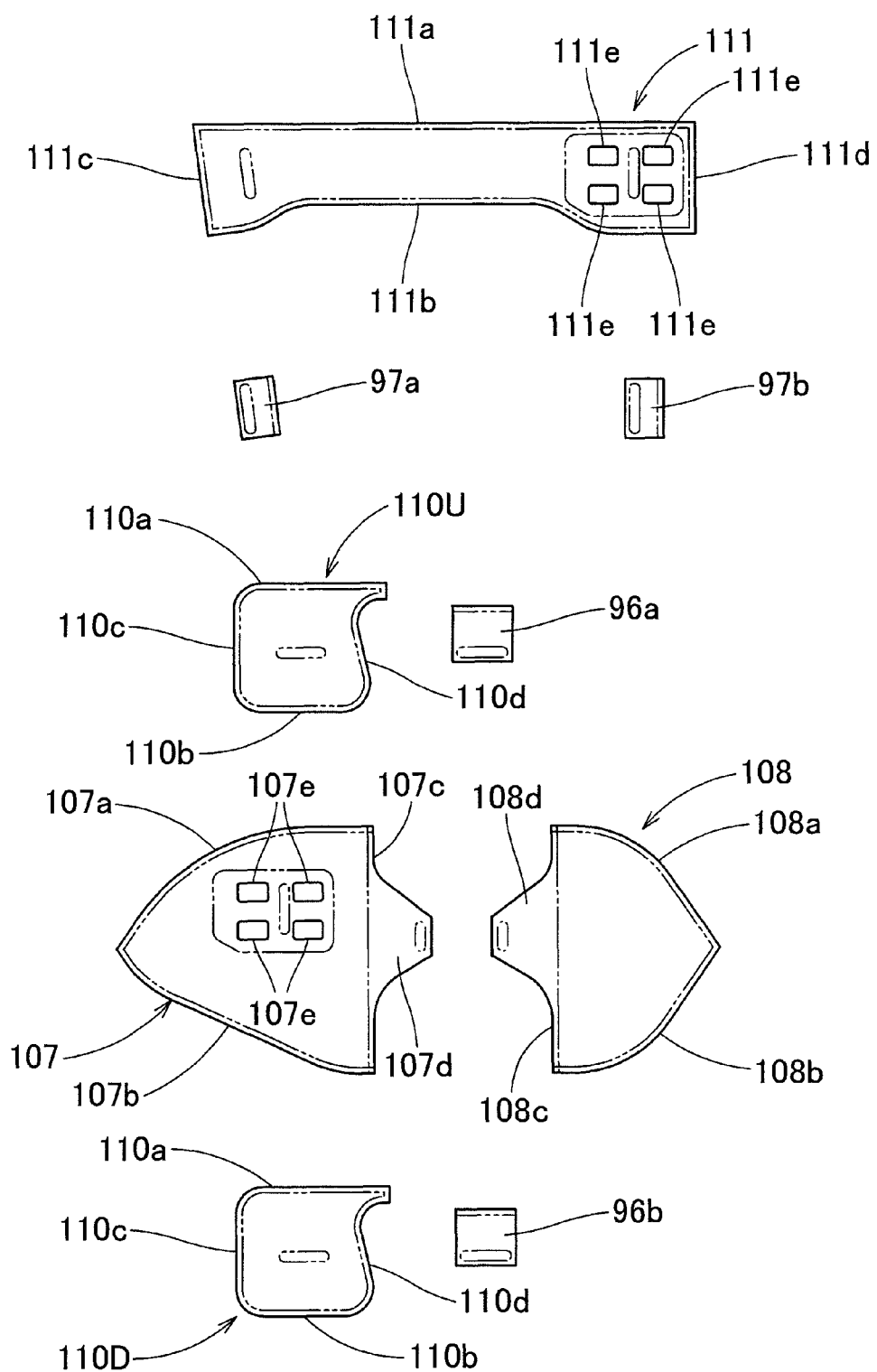

The bag body 76 is formed into a bag by sewing together circumferential edges of predetermined shaped base cloths. As shown in FIGS. 28 and 29, the bag body 76 of this specific embodiment is composed of six pieces of base cloths, i.e., a circumferential panel 103 forming the circumferential wall 78 of the main inflatable region 77, a rear left panel 107 and a rear right panel 108 forming the rear side wall 84 of the main inflatable region 77, an upper panel 110U forming an upper region of the projecting inflatable region 86, a lower panel 110D forming a lower region of the projecting inflatable region 86, a side panel 111 forming a lateral region of the projecting inflatable region 86, and a reinforcing cloth 114 for reinforcing a front end region of the main inflatable region 77 at deployment, four pieces of reinforcing cloths 113 for reinforcing the periphery of the gas inlet port 81 and a protecting cloth 115 for protecting the periphery of the gas inlet port 81 from an inflation gas.

As shown in FIG. 28, the circumferential panel 103 has such a contour that an upper region 104 forming an upper region of the circumferential wall 78 and a lower region 105 forming a lower region of the circumferential wall 78 are connected at the front end of the mounting region 80.

As shown in FIG. 29, each of the rear left panel 107 and rear right panel 108 is formed into such a contour as to form a left/right half region of the rear side wall 84 of the main inflatable region 77. In this specific embodiment, the rear left panel 107 constitutes a region of the rear side wall 84 deployable on the left side of the center line CL2 which runs through the mounting center C2 and extends in a front and rear direction, and the rear right panel 108 constitutes a region of the rear side wall 84 deployable on the right side of the center line CL2 (FIG. 26). The rear left panel 107 is provided with four openings 107e forming the communication hole 87. Each of the rear left panel 107 and rear right panel 108 includes at the inner circumferential edge 107c/108c an extended region 107d/108d which form the rear section 39A of the front-rear tether 37A.

The upper panel 110U constitutes the upper side wall 86a of the projecting inflatable region 86 at airbag deployment while the lower panel 110D constitutes the lower side wall 86b of the projecting inflatable region 86 at airbag deployment. The upper panel 110U and lower panel 110D have a generally identical rectangular contour (FIG. 29) with the front end of the right edge 110d curved toward the right. The side panel 111 is formed into a band whose length direction extends in a left and right direction, and constitutes the front wall 86e, left side wall 86c, rear side wall 86f and right side wall 86d of the projecting inflatable region 86 at airbag deployment. In this specific embodiment, opposite ends in the length direction (or in a left and right direction) of the side panel 111 are located at a boundary area of the front wall 86e and right side wall 86d while forming the front wall 86e, left side wall 86c, rear side wall 86f and right side wall 86d, and the opposite ends in the length direction forming the right end of the front wall 86e and the front end of the right side wall 86d are greater in width than other regions. Further, the side panel 111 includes four openings 111e forming the communication hole 87.

Each of the four reinforcing cloths 113 for reinforcing the periphery of the gas inlet port 81 is a generally rectangle in outer contour. The protecting cloths 115 is formed into a generally rectangle greater than the reinforcing cloths 113. The protecting cloth 115 covers seams of the base cloths located in the periphery of the gas inlet port 81 (specifically, seams that sew edges of the upper region 104 and lower region 105 of the circumferential panel 103 together, reference numeral omitted) from inside and protects the seams from an inflation gas. As shown in FIG. 28, the reinforcing cloth 114 for reinforcing the front end region of the main inflatable region 77 at deployment is formed into such a contour as to cover vicinities of the seams of the upper region 104 and lower region 105 of the circumferential panel 103 entirely in a left and right direction.

In this embodiment, components of the bag body 76, i.e., the circumferential panel 103, rear left panel 107, rear right panel 108, upper panel 110U, lower panel 110D, side panel 111, reinforcing cloths 113 and 114, protecting cloth 115, material 61A forming the front-rear tether 37A, base materials 94a, 94b, 95a, 95b, 96a and 96b of the vertical tethers 94, 95 and 96, base materials 97a and 97b of the regulating tether 97 and vertical section 100 and horizontal section 101 of the outer tether 99, are made of a flexible woven fabric of polyester yarn, polyamide yarn or the like.

Figure 30A:
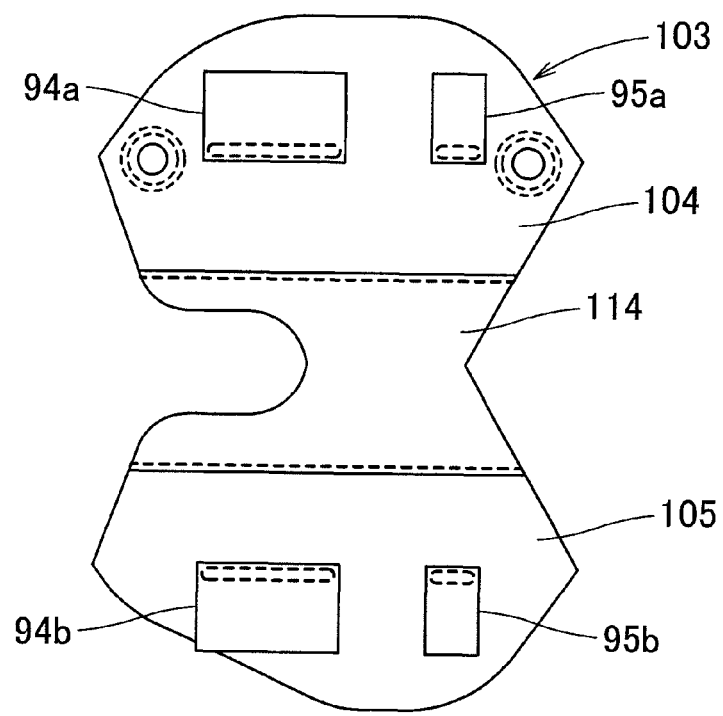
FIGS. 30A to 34C schematically illustrate a manufacturing process of the airbag of the second embodiment.

Manufacturing of the airbag 75 is now described. As preparatory steps, first ends of the base materials 94a, 94b, 95a and 95b for tethers are sewn to the circumferential panel 103 with sewing threads, as shown in FIG. 30A. Also, first ends of the base materials 96a and 96b for tethers are sewn to the upper panel 110U and lower panel 110D with sewing threads, respectively, as shown in FIG. 32B.

Figure 30B:
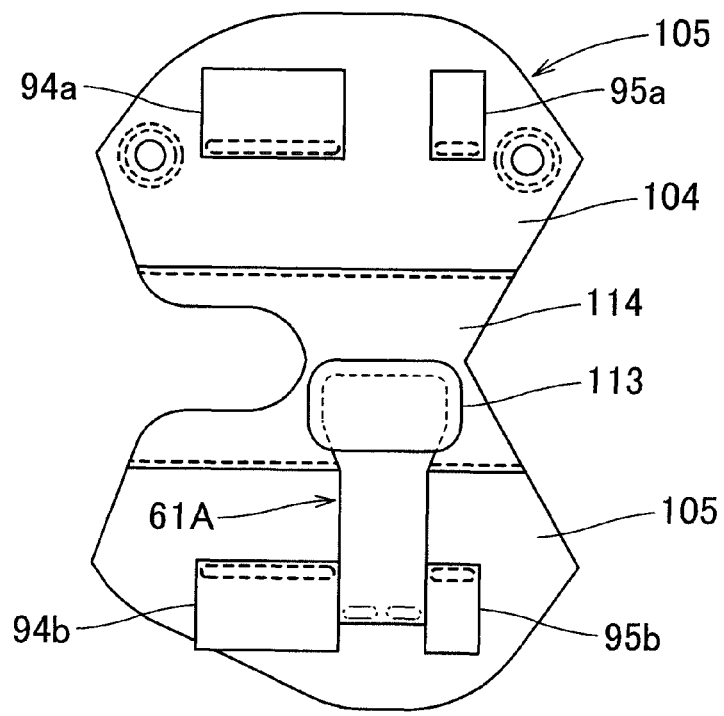
Figure 31A:
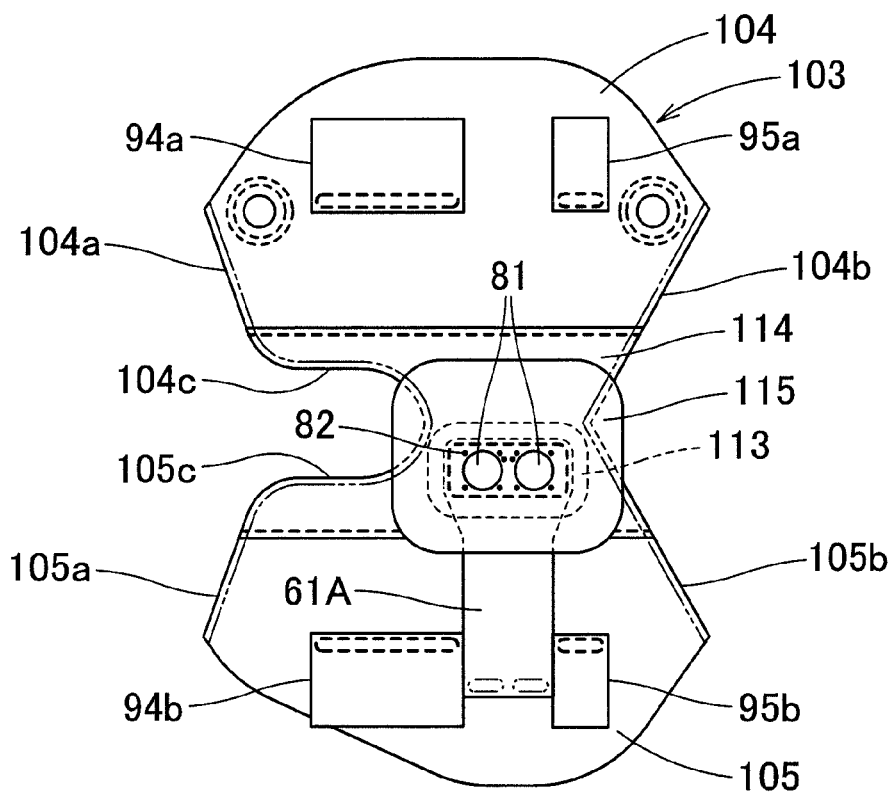
Figure 31B:
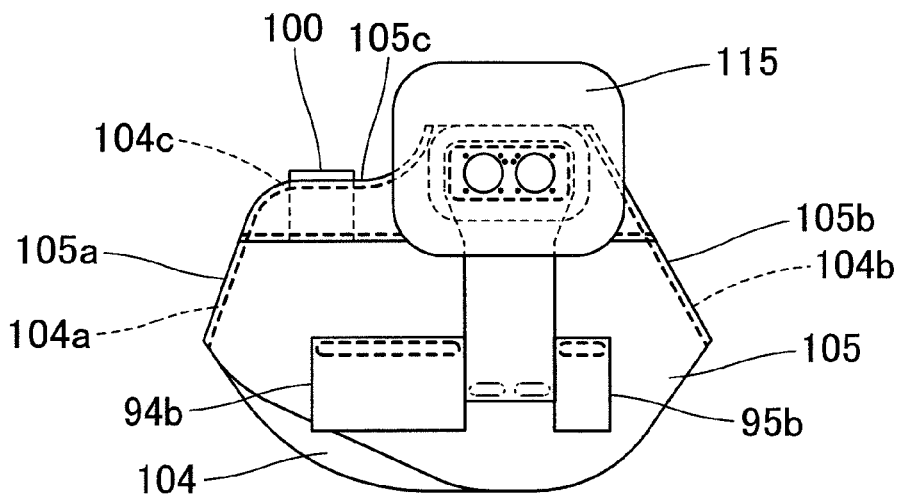

Then firstly, as shown in FIG. 30A, the reinforcing cloth 114 is laid over an inner surface of the circumferential panel 103 spread out in a flattened state, and sewn thereto. Then the material 61A for the front section, the reinforcing cloths 113 and the protecting cloth 115 are laid over the reinforcing cloth 114 as shown in FIGS. 30B and 31A and sewn to the circumferential panel 103 at a position to be the periphery of the gas inlet port 81. Thereafter, the gas inlet port 81 and mounting holes 82 are punched out as shown in FIG. 31A. Subsequently, as shown in FIG. 31B, the circumferential panel 103 is turned so that the reinforcing cloth 114 faces outwardly and the vertical section 100 of the outer tether 99 is placed between front edges of the upper region 104 and lower region 105 of the circumferential panel 103. In that state, front edges 104c and 105c, left edges 104a and 105a and right edges 104b and 105b of the upper region 104 and lower region 105 are sewn up with sewing threads together with the vertical section 100 of the outer tether 99.

Figure 32A:
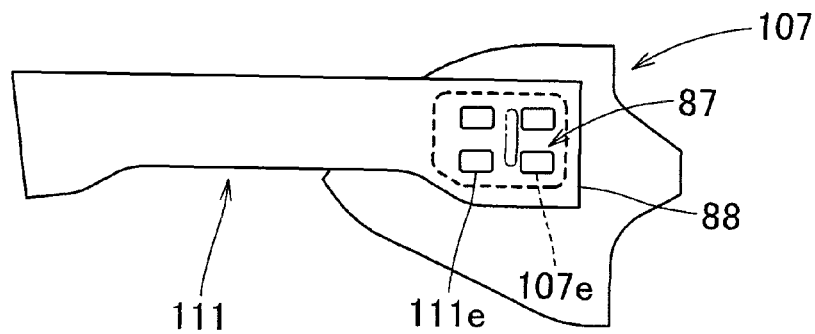
Figure 32B:
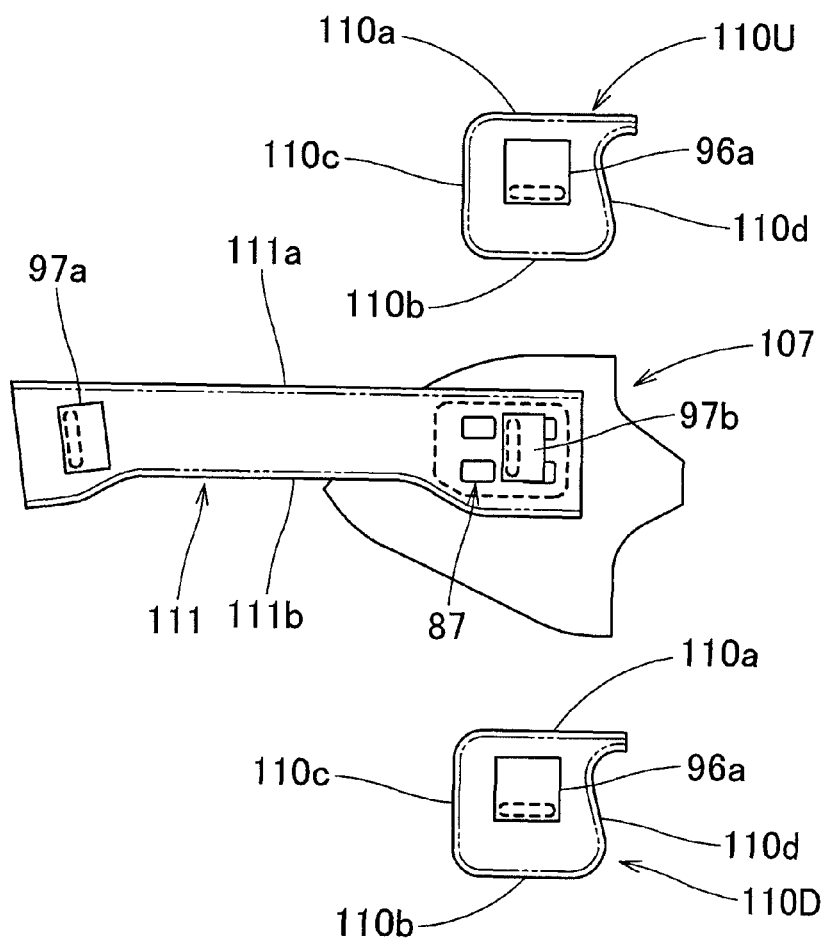
Figure 33A:
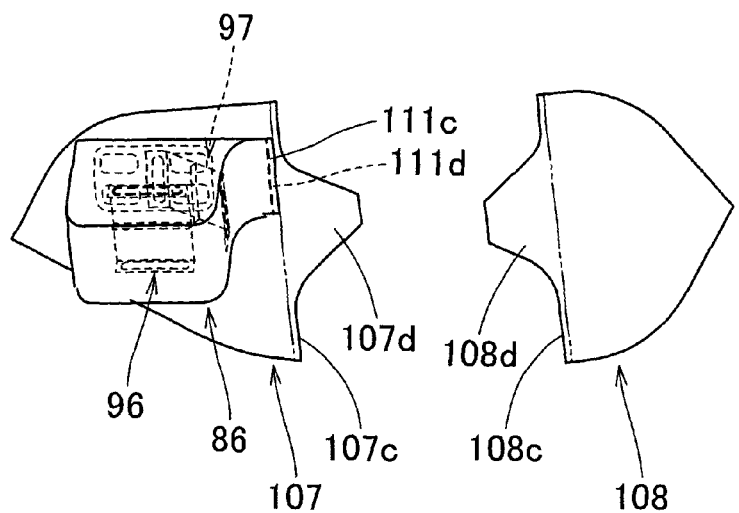
Figure 33B:
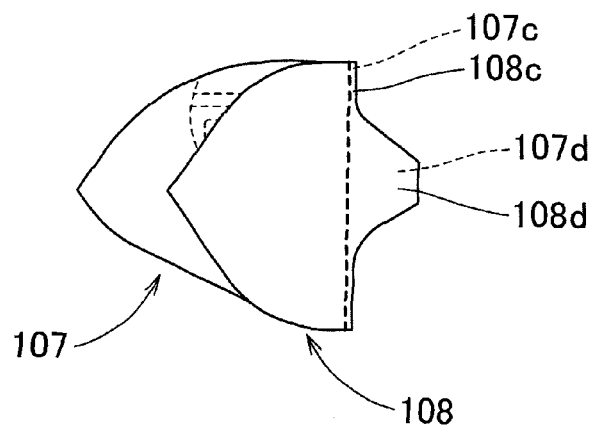
Figure 33C:
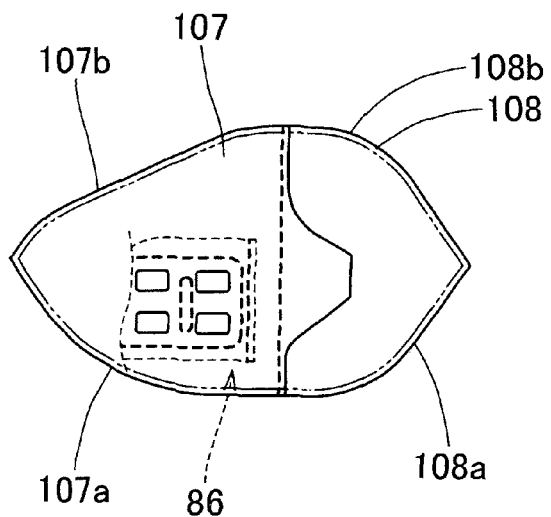

In the meantime, the side panel 111 is laid over an outer surface of the rear left panel 107 such that the positions of the openings 107f and 111e match, and the side panel 111 is sewn to the rear left panel 107 at a periphery of the openings 107f and 111 e as shown in FIG. 32A. Then as shown in FIG. 32B, first ends of the base materials 97a and 97b are sewn to the side panel 111. Thereafter, the front edge 110a of the upper panel 110U is sewn to a right end region of the upper edge 111a of the side panel 111, and the upper panel 110U and side panel 111 are turned toward an inner surface of the rear left panel 107 and a left edge 110c, rear edge 110b and right edge 110d of the upper panel 110U is sewn to a remaining region of the upper edge 111a of the side panel 111. Likewise, the front edge 110a of the lower panel 110D is sewn to a right end region of the lower edge 111b of the side panel 111, and the lower panel 110D and side panel 111 are turned toward the inner surface of the rear left panel 107 and a left edge 110c, rear edge 110b and right edge 110d of the lower panel 110D is sewn to a remaining region of the lower edge 111b of the side panel 111. Then second ends of the base materials 96a and 96b are sewn together to form the vertical tether 96. Thereafter, the upper panel 110U, lower panel 110D and side panel 111 are reversed inside out from an unsewn opening provided at the left edge 111c and right edge 111d of the side panel 111 so seam allowances may not appear outside, and then the rear left panel 107 is flattened. With the aid of the unsewn opening, second ends of the base materials 97a and 97b are jointed together to form the regulating tether 97, and if then the left edge 111c and right edge 111d of the side panel 111 are sewn to the rear left panel 107, the projecting inflatable region 86 is completed as shown in FIG. 33A. Subsequently, inner circumferential edges 107c and 108c of the rear left panel 107 and rear right panel 108 are sewn together with sewing threads, thus the rear side wall 84 with the projecting inflatable region 86 is formed as shown in FIG. 33B.

Figure 34A:
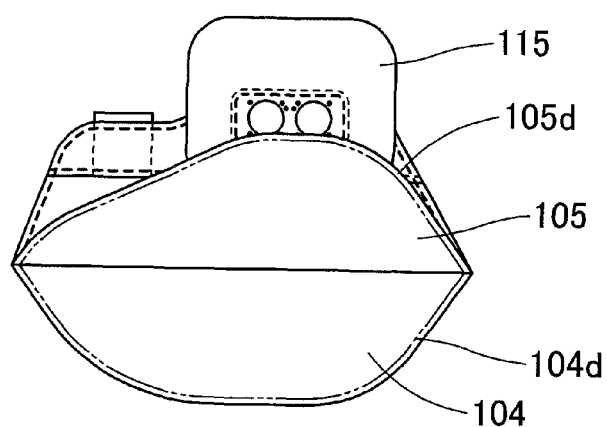
Figure 34B:
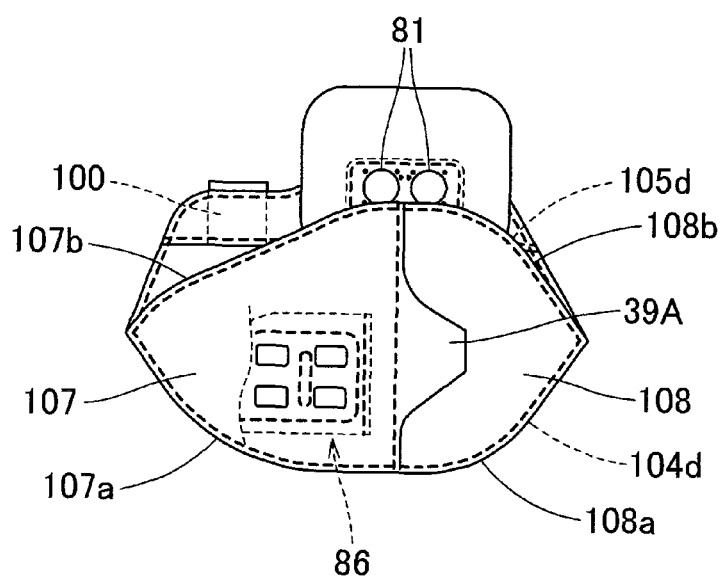
Figure 34C:
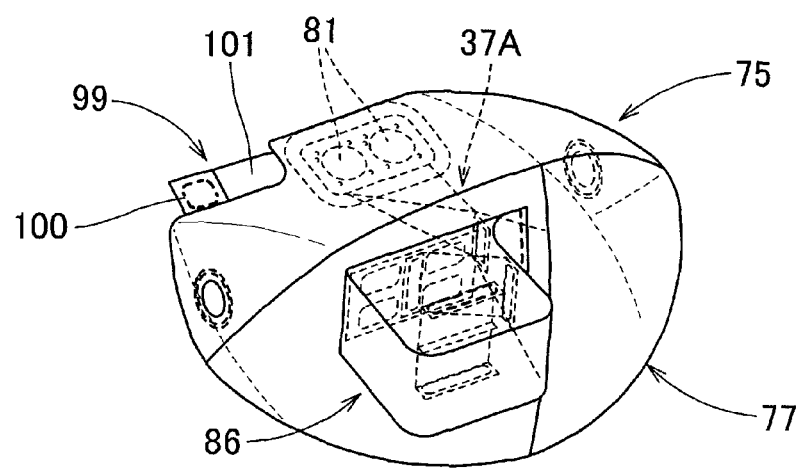
Figure 35:
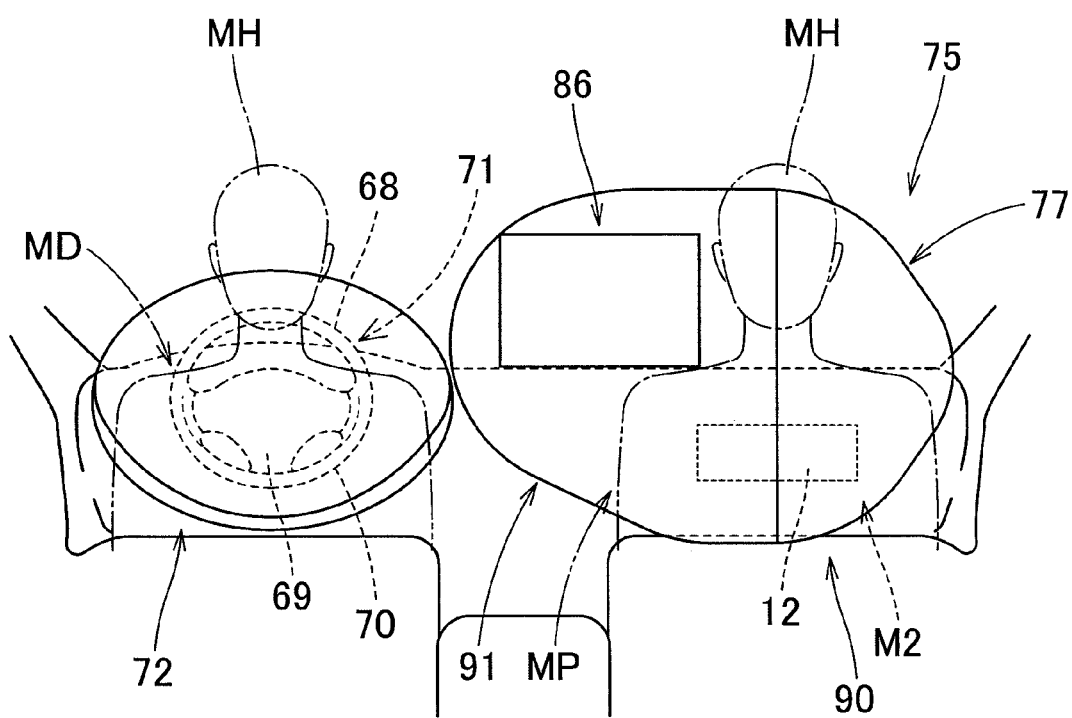
FIG. 35 is a schematic front elevation of the airbag device of the second embodiment as the airbag is deployed.

Then as shown in FIG. 34A, the circumferential panel 103 is opened such that the rear edges 104d and 105d are separated from each other and the rear left panel 107 and rear right panel 108 are laid over there with the projecting inflatable region 86 facing inwardly, and upper edges 107a and 108a of the rear left panel 107 and rear right panel 108 are sewn to the rear edge 104d of the upper region 104 as shown in FIG. 34B. Likewise, lower edges 107b and 108b of the rear left panel 107 and rear right panel 108 are sewn to the rear edge 105d of the lower region 105. Subsequently, if the bag body 76 is reversed inside out via one of the gas inlet ports 81 so seam allowances may not appear on outside, the bag body 76 is completed. Then the rear end 38c of the front section 38A and front end 39a of the rear section 39A are taken out of one of the gas inlet ports 81 and sewn together to form the front-rear tether 37A. Likewise, second ends of the base materials 94a and 94b, 95a and 95b are sewn together, respectively, to form the vertical tethers 94 and 95. Thereafter, if the horizontal section 101 is sewn to the vertical section 100 projecting forward from the left front end 77a of the main inflatable region 77, the outer tether 99 and the airbag 75 are completed as shown in FIG. 34C.

The airbag 75 manufactured as described above is mounted on a vehicle in a similar fashion to the airbag 15 of the first embodiment.

In the airbag device M2 for a front passenger seat of the second embodiment, as shown in FIGS. 36 and 37, the outer tether 99 disposed outside of the airbag 75 connects the front end region (the left front end 77a) of the left region of the main inflatable region 77 constituting the center bag section 91, which is so deployable as to extend rearward from a side of the case or housing 12, to a vicinity of the case 12 (FIG. 38). The outer tether 99 will prevent the left region of the main inflatable region 77 and the projecting inflatable region 86 (i.e., the center bag section 91) from protruding obliquely rearward considerably out of the case 12 in an initial stage of airbag deployment, and also prevent the left front end region 77a of the main inflatable region 77 (i.e., the front end region of the center bag section 91) from expanding in a vehicle width direction. Accordingly, the outer tether 99 will prevent such subsequent rebounding behavior of the center bag section 91 that would shrink forward and expand in a width direction and oscillate repeatedly in a front and rear direction while inflating. As a result, the airbag 75 will form a fully deployed contour quickly. In the second embodiment, especially, the center bag section 91 includes the projecting inflatable region 86 which will deploy the rear end region 91a of the center bag section 91 rearward relative to the main bag section 90 (i.e., the rear side wall 84 of the main inflatable region 77). Although this configuration seems likely to let the center bag section 91 protrude obliquely rearward considerably in an initial stage of deployment, the outer tether 99 will prevent the center bag section 91 from oscillating or bounding back and forth repeatedly while unfurling, and will help inflate the airbag 75 to a fully deployed contour quickly.

Therefore, the airbag device M2 for a front passenger seat of the second embodiment is capable of inflating the airbag 75 with a center bag section 91 deployable in a space between the driver's seat DS and front passenger seat PS into a fully deployed contour quickly.

With the projecting inflatable region (protruding region) 86 which will deploy the rear end region 91a of the center bag section 91 rearward relative to the main bag section 90, the airbag device M2 of the second embodiment will protect a passenger MP in the front passenger seat PS adequately in such an instance where the passenger MP moves diagonally forward left (forward and toward the center in a left and right direction) in the event of an oblique collision or an offset collision of the vehicle V. The projecting inflatable region 86 will also protect the driver MD in the driver's seat DS moving diagonally forward right (forward and toward the center in a left and right direction) as shown in FIG. 36.

In the airbag device M2 of the second embodiment, the main bag section 90 (the right side region of the main inflatable region 77) internally includes the front-rear tether 37A which connects the mounting region 80 disposed at the front end region of the main bag section 90 as fully deployed and the rear side wall 84 deployable at the rear end of the main bag section 90. The front-rear tether 37A will prevent the main bag section 90 (the right side region of the main inflatable region 77) from unfurling in such a manner that the rear side wall 84 protrudes rearward considerably in an initial stage of airbag deployment, and will help inflate the airbag 75 into a fully deployed contour quickly while suppressing an oscillating behavior of the airbag 75 in a front and rear direction. In the second embodiment, the main bag section 90 and center bag section 91 are composed of right and left regions of the main inflatable region 77 and are therefore likely to affect each other in unfurling behavior. However, the outer tether 99 and front-rear tether 37A will cooperatively help stabilize an unfurling behavior of the entire main inflatable region 77, and help inflate the airbag 75 in a quick and steady fashion.

Further, the main inflatable region 77 includes in an interior of each of the left side region constituting the center bag section 91 and the right side region constituting the main bag section 90 the vertical tether 95/94 which connect the upper side wall 78a and lower side wall 78b opposing in an up and down direction at airbag inflation. The vertical tethers 94 and 95 will prevent the entire main inflatable region 77 including the center bag section 91 and main bag section 90 from inflating in such a manner as to expand in an up and down direction when the airbag 75 moves forward after protruding rearward in an initial stage of deployment, and will prevent the entire main inflatable region 77 from inflating in such a manner as to swell and contract in an up and down direction repeatedly, thus help inflate the airbag 75 into a fully deployed contour quickly. The tethers 94 and 95 will also limit a volume of the main inflatable region 77 (main bag section 90 and center bag section 91) at inflation.

The airbag 15 of the first embodiment may also be provided with such a vertical tether as indicated by double-dotted lines in FIG. 7.

What is claimed is:

1. An airbag device for a front passenger seat adapted to be mounted on an instrument panel of a vehicle in front of a front passenger seat and comprising a housing adapted to be disposed in the instrument panel and an airbag housed in the housing in a folded-up configuration and being inflatable with an inflation gas for deployment rearward inside the vehicle, the airbag comprising:
   a main bag section that protrudes rearward out of the housing and deploys in front of the front passenger seat;
   a center bag section that deploys toward an inboard direction from the main bag section in a width direction of the vehicle and in front of a space between the front passenger seat and a driver's seat in such a manner as to extend rearward from a side of the housing, a rear end region of the center bag section being deployable rearward relative to the main bag section; and
   an outer tether that extends outside of the airbag from a front end region of the center bag section and is connected to a vicinity of the housing by a leading end of the outer tether,
   wherein the main bag section includes a mounting region that is located at a front end of the main bag section as deployed and is secured to the housing, a rear side wall deployable on a rear end region of the main bag section for protecting a passenger and a front-rear tether that connects the mounting region and the rear side wall and extends in a front and rear direction inside the main bag section,
   wherein the center bag section internally includes a vertical tether that connects opposite walls of the center bag section opposing in an up and down direction at airbag inflation.

2. The airbag device for a front passenger seat of claim 1, wherein the outer tether extends from a side wall of the center bag section which faces away from the main bag section.

3. The airbag device for a front passenger seat of claim 1, wherein the outer tether extends from a front edge of the center bag section.

4. The airbag device for a front passenger seat of claim 1, wherein the center bag section further internally includes a left-right tether that connects opposite walls of the center bag section opposing in a left and right direction at airbag inflation.

5. The airbag device for a front passenger seat of claim 1, wherein the main bag section further internally includes a second vertical tether that connects opposite walls of the main bag section opposing in an up and down direction at airbag inflation.

* * * * *